(12) United States Patent
Iino

(10) Patent No.: US 9,091,299 B2
(45) Date of Patent: *Jul. 28, 2015

(54) BEARING DEVICE, METHOD OF MANUFACTURING BEARING DEVICE, AND INFORMATION RECORDING/REPRODUCING APPARATUS

(71) Applicant: SEIKO INSTRUMENTS INC., Chiba (JP)

(72) Inventor: Akihiro Iino, Chiba (JP)

(73) Assignee: SEIKO INSTRUMENTS INC. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/053,644

(22) Filed: Oct. 15, 2013

(65) Prior Publication Data

US 2014/0105529 A1    Apr. 17, 2014

(30) Foreign Application Priority Data

Oct. 15, 2012  (JP) .................................. 2012-228112
Jul. 4, 2013   (JP) .................................. 2013-141131

(51) Int. Cl.

| F16C 33/58 | (2006.01) |
|---|---|
| F16C 43/04 | (2006.01) |
| F16C 33/40 | (2006.01) |
| F16C 35/06 | (2006.01) |
| F16C 35/063 | (2006.01) |

(Continued)

(52) U.S. Cl.

CPC ............... *F16C 33/58* (2013.01); *F16C 19/543* (2013.01); *F16C 35/063* (2013.01); *F16C 35/077* (2013.01); *F16C 43/04* (2013.01); *F16C 19/163* (2013.01); *F16C 33/416* (2013.01); *F16C 33/581* (2013.01); *F16C 2226/40* (2013.01); *F16C 2229/00* (2013.01); *F16C 2370/12* (2013.01); *Y10T 29/49682* (2015.01)

(58) Field of Classification Search

CPC .... F16C 19/163; F16C 33/416; F16C 33/418; F16C 33/581; F16C 35/063; F16C 35/077; F16C 2370/12

USPC ......... 384/490, 506–507, 510–513, 543, 504, 384/560; 29/898.61, 898.062, 898.064; 360/98.07, 99.043, 99.08, 99.23

See application file for complete search history.

(56) References Cited

U.S. PATENT DOCUMENTS 3,619,017 A * 11/1971 Robinson et al. ............. 384/513
3,651,550 A *  3/1972 Bennett ...................... 29/898.09

(Continued)

FOREIGN PATENT DOCUMENTS

JP        2006266496 A   *   7/2001

OTHER PUBLICATIONS

Patent Abstracts of Japan, Publication No. 2008-202606, Publication Date Sep. 4, 2008.

*Primary Examiner* — Marcus Charles
(74) *Attorney, Agent, or Firm* — Adams & Wilks

(57) ABSTRACT

A bearing device includes inner ring rolling surfaces formed so that the external radius of inner end portions of a first inner ring and a second inner ring is smaller than a first separation distance and formed so as to have an external radius that becomes larger from an inner side toward the other side, and outer ring rolling surfaces formed so that the internal radius of outer end portions of a first outer ring and a second outer ring is larger than a second separation distance and is formed so as to have an internal radius that becomes smaller from the outer side toward the inner side.

18 Claims, 18 Drawing Sheets

(51) Int. Cl.
*F16C 35/077* (2006.01)
*F16C 19/54* (2006.01)
*F16C 19/16* (2006.01)
*F16C 33/41* (2006.01)

(56) References Cited

U.S. PATENT DOCUMENTS

| | | | | |
|---|---|---|---|---|
| 4,133,588 | A | * | 1/1979 | Earsley .......................... 384/470 |
| 4,604,665 | A | * | 8/1986 | Muller et al. .............. 360/99.23 |
| 4,900,958 | A | * | 2/1990 | Kitahara et al. ............ 310/67 R |
| 5,045,738 | A | * | 9/1991 | Hishida et al. .................. 310/90 |
| 5,067,827 | A | * | 11/1991 | Bokel ............................ 384/537 |
| 5,132,856 | A | * | 7/1992 | Takahashi .................. 360/99.08 |
| 5,138,209 | A | * | 8/1992 | Chuta et al. .................. 310/67 R |
| 5,150,973 | A | * | 9/1992 | Masur et al. .................. 384/510 |
| 6,181,513 | B1 | * | 1/2001 | Obara ........................ 360/99.08 |
| 6,256,173 | B1 | * | 7/2001 | Chee et al. .................. 360/265.7 |
| 6,354,743 | B2 | * | 3/2002 | Muraki et al. ................. 384/490 |
| 6,394,657 | B1 | * | 5/2002 | Takamizawa et al. ........ 384/512 |
| 6,527,449 | B1 | * | 3/2003 | Koyama et al. ............... 384/535 |
| 6,794,774 | B2 | * | 9/2004 | Obara et al. ................. 310/67 R |
| 6,896,415 | B2 | * | 5/2005 | Ishiwada et al. .............. 384/517 |

* cited by examiner

BEARING DEVICE, METHOD OF MANUFACTURING BEARING DEVICE, AND INFORMATION RECORDING/REPRODUCING APPARATUS

BACKGROUND OF THE INVENTION

1. Field of the Invention

The present invention relates to a bearing device, a method of manufacturing the bearing device, and an information recording/reproducing apparatus.

2. Background Art

In the related art, information recording/reproducing apparatuses, such as hard disks, which make various kinds of information recorded and reproduced with respect to disks (equivalent to a "magnetic recording medium" of the claims), have been known. Generally, information recording/reproducing apparatuses include a head gimbal assembly equipped with a slider that records and reproduces signals with respect to a disk, and an arm (equivalent to a "rotating member" of the claims) having the head gimbal assembly mounted on a tip side. The arm is made rotatable by a bearing device provided on a base end side. By rotating the arm, the slider can be moved to a predetermined position of a disk so as to perform recording and reproducing of signals.

Generally, bearing devices includes a shaft, and a pair of rolling bearings that are inserted into the shaft and are arranged side by side in the axial direction of the shaft. Additionally, the pair of rolling bearings each include an inner ring fixed to the shaft, an outer ring surrounding the inner ring, a reinforcing sleeve that covers the outer ring, and a plurality of rolling elements that are arranged between the inner ring and the outer ring. The arm is externally fitted to the outer ring via the sleeve.

Incidentally, in a process of manufacturing a rolling bearing, an operation of equally arranging a plurality of rolling elements between an inner ring and an outer ring is performed (for example, refer to JP-A-2008-202606). Generally, in order to equally arrange the plurality of rolling elements between the inner ring and the outer ring, the plurality of rolling elements are individually inserted between the inner ring and the outer ring while relatively shifting the central axes of the inner ring and the outer ring in the radial direction and providing a larger gap than the external diameter of the rolling elements between the inner ring and the outer ring. Thereafter, a retainer capable of rollably retaining the rolling elements in an equally arranged state is mounted after the plurality of rolling elements are equally arranged in a circumferential direction.

However, in the process of manufacturing a rolling bearing in the related art, in order to insert the plurality of rolling elements between the inner ring and the outer ring while shifting the inner ring and the outer ring from each other, operation is complicated and a large number of operation steps are required. Additionally, in order to equally arrange the plurality of rolling elements, for example, exclusive manufacturing apparatuses, such as an air jetting apparatus described in the related art, are required, and great facility cost is required. Accordingly, there is a possibility that the manufacturing cost of the rolling bearing may become high.

SUMMARY OF THE INVENTION

Thus, an object of the invention is to provide a bearing device that can be manufactured with simple operation and with reduction in manufacturing cost, a method of manufacturing the bearing device, and an information recording/reproducing apparatus including the bearing device.

In order to solve the above problems, according to an aspect of the invention, a bearing device includes a shaft; and a pair of rolling bearing portions that are arranged side by side in an axial direction of the shaft. The pair of rolling bearing portions each include an inner ring that is arranged coaxially with a central axis of the shaft; an outer ring that surrounds the inner ring from an outer side of the shaft in a radial direction; and a plurality of rolling elements that are rollably retained between the inner ring and the outer ring. When a separation distance between an innermost portion of the rolling elements in the radial direction and the central axis is defined as a first separation distance and a separation distance between an outermost portion of the rolling elements in the radial direction and the central axis is defined as a second separation distance, the inner ring includes an inner ring rolling surface formed so that the external radius of an end portion on any one side of an inner side and an outer side in the axial direction is smaller than the first separation distance and formed so as to have an external radius that becomes larger than the first separation distance from the one side in the axial direction toward any other side of the inner side and the outer side in the axial direction, and the outer ring includes an outer ring rolling surface formed so that the internal radius of an end portion on the other side in the axial direction is larger than the second separation distance and formed so as to have an internal radius that becomes smaller than the second separation distance from the other side toward the one side in the axial direction.

According to the above aspect of the invention, the inner ring includes the inner ring rolling surface formed so that the external radius of the end portion on one side in the axial direction is smaller than the first separation distance and formed so as to have the external radius that becomes larger than the first separation distance from the one side toward the other side in the axial direction, and the outer ring includes the outer ring rolling surface formed so that the internal radius of the end portion on the other side in the axial direction is larger than the second separation distance and formed so as to have the internal radius that becomes smaller than the second separation distance from the other side toward the one side in the axial direction. Thus, the rolling elements can be easily arranged between the inner ring rolling surface and the outer ring rolling surface by inserting the outer ring from the axial direction after the equally and annularly arranged rolling elements are placed on the inner ring rolling surface or inserting the inner ring from the axial direction after the equally and annularly arranged rolling elements are placed on the outer ring rolling surface. As a result, since the related-art, complicated operation of inserting the rolling elements between the inner ring and the outer ring while shifting the inner ring and the outer ring from each other and equally arranging the plurality of rolling elements in the circumferential direction, and an exclusive manufacturing apparatus are unnecessary, the rolling bearing portions can be manufactured with simple operation. Accordingly, the reduction in overall cost of the bearing device can be realized.

Additionally, since a die can be moved in the axial direction to form the inner ring and the outer ring, the inner ring and the outer ring can be formed at low cost using forging or the like.

Additionally, when the rolling elements are inserted between the inner ring and the outer ring while shifting the inner ring and the outer ring from each other as in the related art, the number and/or size of the rolling elements that can be inserted are limited by the size of a gap between the inner ring and the outer ring. In contrast, according to the above aspect of the invention, since the plurality of rolling elements are arranged between the inner ring rolling surface and the outer ring rolling surface by inserting the outer ring from the axial direction after the rolling elements are placed on the inner ring rolling surface or inserting the inner ring from the axial direction after the rolling elements are placed on the outer ring rolling surface, the rolling elements can be arranged without being limited in number and/or size thereof due to a gap between the inner ring and the outer ring unlike the related art. Accordingly, the rigidity of the bearing device can be set as desired.

Additionally, in the aspect of the invention, the inner rings of the pair of rolling bearing portions each may include an inner ring rolling surface formed so that the external radius of an inner end portion in the axial direction is smaller than the first separation distance and formed so as to have an external radius that becomes larger than the first separation distance from the inner side toward the outer side in the axial direction, and the outer rings of the pair of rolling bearing portions each may include an outer ring rolling surface formed so that the internal radius of an outer end portion in the axial direction is larger than the second separation distance and formed so as to have an internal radius that becomes smaller than the second separation distance from the outer side toward the inner side in the axial direction.

According to the above aspect of the invention, the inner rings of the pair of rolling bearing portions each include the inner ring rolling surface formed so that the external radius of the inner end portion in the axial direction is smaller than the first separation distance and formed so as to have the external radius that becomes larger than the first separation distance from the inner side toward the outer side in the axial direction, and the outer rings of the pair of rolling bearing portions each include the outer ring rolling surface formed so that the internal radius of the outer end portion in the axial direction is larger than the second separation distance and formed so as to have the internal radius that becomes smaller than the second separation distance from the outer side toward the inner side in the axial direction. Thus, the rolling elements can be easily arranged between the inner ring rolling surface and the outer ring rolling surface by inserting the outer ring from the axial direction after the rolling elements are placed on the inner ring rolling surface or inserting the inner ring from the axial direction after the rolling elements are placed on the outer ring rolling surface.

Additionally, in the aspect of the invention, the bearing device may further include a retainer capable of rollably retaining the plurality of rolling elements to annularly and equally arrange the rolling elements, and the retainers of the pair of rolling bearing portions each may be formed so as to have an internal radius that becomes larger than a maximum external radius of the inner ring and so as to have an external radius that becomes smaller than a minimum internal radius of the outer ring.

According to the present embodiment, since the inner rings of the pair of rolling bearing portions each include the inner ring rolling surface formed so that the external radius of the inner end portion in the axial direction is smaller than the first separation distance and so as to have an external radius that becomes larger than the first separation distance from the inner side toward the outer side in the axial direction, and the retainers of the pair of rolling bearing portions each are formed so that the internal radius thereof is larger than the maximum external radius of the inner ring, the rolling elements can be inserted from the inner end portion in the axial direction together with the retainer and placed on the inner ring rolling surface, without interference between the retainer and the inner ring in a state where the rolling elements are retained by the retainer and annularly and equally arranged.

Additionally, since the outer rings of the pair of rolling bearing portions each include the outer ring rolling surface formed so that the internal radius of the outer end portion in the axial direction is larger than the second separation distance and so as to have the internal radius that becomes smaller than the second separation distance from the outer side toward the inner side in the axial direction, and the retainers of the pair of rolling bearing portions each are formed so that the external radius thereof is smaller than the minimum internal radius of the outer ring, the rolling elements can be inserted from the outer end portion in the axial direction together with the retainer and placed on the outer ring rolling surface, without interference between the retainer and the outer ring in a state where the rolling elements are retained by the retainer and are annularly and equally arranged.

Since this enables the rolling bearing portions to be easily formed without requiring the complicated operation of related art which equally arranges the plurality of rolling elements in the circumferential direction after the rolling elements are inserted between the inner ring and the outer ring while shifting the inner ring and the outer ring from each other, the reduction in overall cost of the bearing device can be realized.

Additionally, in the aspect of the invention, the retainer may include a body portion, and an a plurality of claw portion pairs that are formed integrally with the body portion and are capable of retaining the rolling elements, and each of the plurality of claw portion pairs may be erected in the axial direction from the body portion.

According to the above aspect of the invention, since each of the plurality of claw portion pairs are erected in the axial direction from the body portion, compared to a case where the plurality of claw portion pairs are inclined with respect to the axial direction, the internal radius of the retainer can be made as large as possible, and the external radius of the retainer can be made as small as possible. Accordingly, the retainer can be reliably kept from interfering with the inner ring and the outer ring, and the bearing device can be reduced in size even in the radial direction.

Additionally, in the aspect of the invention, the body portion of the retainer may be arranged further toward the inner side in the axial direction than the rolling elements.

According to the above aspect of the invention, since the body portion of the retainer can be arranged in a dead space provided further toward the inner side in the axial direction than the rolling elements, reduction in thickness of the bearing device can be prevented from being limited by the body portion of the retainer. This enables the bearing device to have as much reduction in thickness as possible.

Additionally, in the aspect of the invention, the outer end portion of the outer ring in the axial direction may be arranged further toward the inner side in the axial direction than an outer end portion of the inner ring in the axial direction.

According to the above aspect of the invention, since the axial length of the outer ring can be shortened, further reduction in size, weight, and cost of the bearing device can be realized. Additionally, since the weight of the outer ring can be reduced, the resonant point of the bearing device can be raised and it is also possible to cope with a high-speed operation.

Additionally, in the aspect of the invention, a distance from an imaginary plane including the center of the plurality of rolling elements to the inner end portion of the inner ring in the axial direction may be formed so as to become shorter than a distance from the imaginary plane to an outer end portion of the inner ring in the axial direction.

According to the above aspect of the invention, since the axial length of the inner ring can be shortened, further reduction in size, weight, and cost of the bearing device can be realized.

Additionally, in the aspect of the invention, any one inner ring of the inner rings of the pair of rolling bearing portions, and the shaft may be formed integrally with each other.

According to the above aspect of the invention, since the number of parts of the bearing device can be further reduced, further reduction in size, weight, and cost of the bearing device can be realized. Additionally, since it is not necessary to insert one inner ring out of the inner rings of the pair of rolling bearing portions into the shaft, the number of assembling steps of the bearing device can be reduced, and manufacturing cost can be reduced. Accordingly, further reduction in overall cost of the bearing device can be realized.

Additionally, in the aspect of the invention, the inner ring and the outer ring may be formed by forging.

According to the above aspect of the invention, the inner ring and the outer ring can be formed at low cost using forging, and the number of steps of cutting work can be reduced. Accordingly, the reduction in overall cost of the bearing device can be realized.

Additionally, according to another aspect of the invention, a method of manufacturing the bearing device includes a first inner ring arranging step of inserting a first inner ring out of the inner rings of the pair of rolling bearing portions into the shaft and arranging the first inner ring on one side in the axial direction; a first rolling element arranging step of inserting the plurality of rolling elements into the first inner ring from the other side in the axial direction and placing the plurality of rolling elements on the inner ring rolling surface of the first inner ring; a first outer ring arranging step of arranging a first outer ring out of the outer rings of the pair of rolling bearing portions on the outer side of the first inner ring in the radial direction and making the outer ring rolling surface of the first outer ring abut against the plurality of rolling elements; a second outer ring arranging step of arranging a second outer ring out of the outer rings of the pair of rolling bearing portions on the other side in the axial direction; a second rolling element arranging step of inserting the plurality of rolling elements into the second outer ring from the other side in the axial direction and placing the plurality of rolling elements on the outer ring rolling surface on the other side in the axial direction; a second inner ring arranging step of inserting a second inner ring out of the inner rings of the pair of rolling bearing portions into the shaft and arranging the second inner ring on the other side in the axial direction; and a preload applying step of fixing the first inner ring and the second inner ring to the shaft while relatively pressing the first inner ring and the second inner ring in the axial direction.

According to the above aspect of the invention, since the first rolling element arranging step and the second rolling element arranging step of inserting the rolling elements from the axial direction are included, the complicated operation of equally arranging the plurality of rolling elements in the circumferential direction after the rolling elements are inserted between the inner ring and the outer ring while shifting the inner ring and the outer ring from each other is not required unlike the related art. Accordingly, since the bearing device can be simply manufactured compared to the related art, the manufacturing cost can be reduced and the reduction in overall cost of the bearing device can be realized.

Additionally, when the rolling elements are inserted between the inner ring and the outer ring while shifting the inner ring and the outer ring from each other as in the related art, the number and/or size of the rolling elements that can be inserted are limited by the size of a gap between the inner ring and the outer ring. In contrast, according to the above aspect of the invention, since the first outer ring arranging step of inserting the outer ring from the axial direction after the rolling elements are placed on the inner ring rolling surface and the second inner ring arranging step of inserting the inner ring from the axial direction after the rolling elements are placed on the outer ring rolling surface are included, the rolling elements can be arranged without being limited in number and/or size thereof due to a gap between the inner ring and the outer ring unlike the related art. Accordingly, the rigidity of the bearing device can be increased.

Additionally, according to still another aspect of the invention, a method of manufacturing the bearing device includes a first arranging step of arranging any one member of the inner ring and the outer ring of a first rolling bearing portion out of the pair of rolling bearing portions; a first rolling element arranging step of inserting and arranging the plurality of rolling elements with respect the one member of the first rolling bearing portion from the axial direction; a second arranging step of inserting and arranging any other member of the inner ring and the outer ring of the first rolling bearing portion with respect to the plurality of rolling elements from the axial direction; a third arranging step of continuously arranging any other member of the inner ring and the outer ring of a second rolling bearing portion out of the pair of rolling bearing portions in the axial direction with respect to the other member of the first rolling bearing portion; a second rolling element arranging step of inserting and arranging the plurality of rolling elements with respect to the other member of the second rolling bearing portion from the axial direction; a fourth arranging step of inserting and arranging any one member of the inner ring and the outer ring of the second rolling bearing portion with respect to the plurality of rolling elements from the axial direction; and a preload applying step of relatively pressing and fixing any of the inner rings and the outer rings of the pair of rolling bearing portions in the axial direction.

According to the above aspect of the invention, since the first arranging step to the fourth arranging step are included, the plurality of rolling elements are arranged between the inner ring rolling surface and the outer ring rolling surface by inserting the outer ring from the axial direction after the rolling elements are placed on the inner ring rolling surface or inserting the inner ring from the axial direction after the rolling elements are placed on the outer ring rolling surface. Thus, the rolling elements can be arranged without being limited in number and/or size thereof due to a gap between the inner ring and the outer ring unlike the related art. Accordingly, the rigidity of the bearing device can be set as desired.

Additionally, according to still another aspect of the invention, a method of manufacturing the bearing device includes a first inner ring arranging step of inserting a first inner ring out of the inner rings of the pair of rolling bearing portions into the shaft and arranging the first inner ring on one side in the axial direction; a retainer retaining step of making each of a first retainer and a second retainer out of the retainers of the pair of rolling bearing portions rollably retain and equally and annularly arrange the plurality of rolling elements; a first rolling element arranging step of inserting the plurality of rolling elements into the first inner ring together with the first retainer from the other side in the axial direction and placing the plurality of rolling elements on the inner ring rolling surface of the first inner ring; a first outer ring arranging step of arranging a first outer ring out of the outer rings of the pair of rolling bearing portions on the outer side of the first inner ring in the radial direction and making the outer ring rolling surface of the first outer ring abut against the plurality of rolling elements; a second outer ring arranging step of arranging a second outer ring out of the outer rings of the pair of rolling bearing portions on the other side in the axial direction; a second rolling element arranging step of inserting the plurality of rolling elements into the second outer ring together with the second retainer from the other side in the axial direction and placing the plurality of rolling elements on the outer ring rolling surface on the other side in the axial direction; a second inner ring arranging step of inserting a second inner ring out of the inner rings of the pair of rolling bearing portions into the shaft and arranging the second inner ring on the other side in the axial direction; and a preload applying step of fixing the first inner ring and the second inner ring to the shaft while relatively pressing the first inner ring and the second inner ring in the axial direction.

According to the above aspect of the invention, after the plurality of rolling elements are retained by the first retainer and the second retainer and are annularly and equally arranged in advance in the retainer retaining step, the plurality of rolling elements can be placed on the inner ring rolling surface and the outer ring rolling surface together with the first retainer and the second retainer, in the first rolling element arranging step and the second rolling element arranging step. Additionally, since this enables the plurality of rolling elements to be equally arranged at a time, the complicated operation of equally arranging the plurality of rolling elements in the circumferential direction after the rolling elements are inserted between the inner ring and the outer ring while shifting the inner ring and the outer ring from each other is not required unlike the related art.

Additionally, since the inner rings of the pair of rolling bearing portions each include the inner ring rolling surface formed so as to have the external radius that becomes larger than the first separation distance from the inner side toward the outer side in the axial direction can be simply placed on the inner ring rolling surface without using a jig or the like when being inserted into the first inner ring from the other side (inner side in the axial direction) in the axial direction in the first rolling element arranging step.

Additionally, since the first retainer and the second retainer each are formed so that the internal radius thereof becomes larger than the maximum external radius of the first inner ring and the second inner ring, the rolling elements can be arranged on the respective inner ring rolling surfaces without interference between the first retainer or the second retainer and the first inner ring or the second inner ring, in the first rolling element arranging step and the second inner ring arranging step.

Additionally, since the outer rings of the pair of rolling bearing portions each include the outer ring rolling surface formed so as to have an internal radius that becomes smaller than the second separation distance from the outer side toward the inner side in the axial direction, the plurality of rolling elements can be simply placed on the outer ring rolling surface without using a jig or the like when being inserted into the outer ring from the other side (outer side in the axial direction) in the axial direction in the second rolling element arranging step.

Additionally, since the first retainer and the second retainer each are formed so that the external radius thereof becomes smaller than the minimum internal radius of the first outer ring and the second outer ring, the rolling elements can be arranged on the respective outer ring rolling surfaces without interference between the first retainer or the second retainer and the first outer ring or the second outer ring, in the first outer ring arranging step and the second outer ring arranging step.

In this way, according to the method of manufacturing the bearing device of the above aspect of the invention, the bearing device can be manufactured in a simple manner. Thus, the manufacturing cost can be reduced and the reduction in overall cost of the bearing device can be realized.

Additionally, according to still another aspect of the invention, an information recording/reproducing apparatus includes the above-described bearing device; a housing that supports one end portion of the bearing device; a rotating member that is externally fitted to the outer rings and rotates around the central axis of the shaft; and a slider that is mounted on the rotating member and performs recording and reproducing of information with respect to a magnetic recording medium.

Additionally, according to the above aspect of the invention, the bearing device with reduction in overall cost is included. Thus, the reduction in overall cost of the information recording/reproducing apparatus can be realized.

According to the invention, since the inner ring includes the inner ring rolling surface formed so that the external radius of the end portion on one side in the axial direction is smaller than the first separation distance and formed so as to have the external radius that becomes larger than the first separation distance from the one side toward the other side in the axial direction, and the outer ring includes the outer ring rolling surface formed so that the internal radius of the end portion on the other side in the axial direction is larger than the second separation distance and formed so as to have the internal radius that becomes smaller than the second separation distance from the other side toward the one side in the axial direction, the rolling elements can be easily arranged between the inner ring rolling surface and the outer ring rolling surface by inserting the outer ring from the axial direction after the equally and annularly arranged rolling elements are placed on the inner ring rolling surface or inserting the inner ring from the axial direction after the equally and annularly arranged rolling elements are placed on the outer ring rolling surface. As a result, since the related-art, complicated operation of inserting the rolling elements between the inner ring and the outer ring while shifting the inner ring and the outer ring from each other and equally arranging the plurality of rolling elements in the circumferential direction, and an exclusive manufacturing apparatus are unnecessary, the rolling bearing portions can be manufactured with simple operation. Accordingly, the reduction in overall cost of the bearing device can be realized.

Additionally, since a die can be moved in the axial direction to form the inner ring and the outer ring, the inner ring and the outer ring can be formed at low cost using forging or the like.

Additionally, when the rolling elements are inserted between the inner ring and the outer ring while shifting the inner ring and the outer ring from each other as in the related art, the number and/or size of the rolling elements that can be inserted are limited by the size of a gap between the inner ring and the outer ring. In contrast, according to the invention, since the plurality of rolling elements are arranged between the inner ring rolling surface and the outer ring rolling surface by inserting the outer ring from the axial direction after the rolling elements are placed on the inner ring rolling surface and inserting the inner ring from the axial direction after the rolling elements are placed on the outer ring rolling surface, the rolling elements can be arranged without being limited in number and/or size thereof due to a gap between the inner ring and the outer ring unlike the related art. Accordingly, the rigidity of the bearing device can be set as desired.

DETAILED DESCRIPTION OF THE INVENTION

A bearing device, a method of manufacturing the bearing device, and an information recording/reproducing apparatus related to a first embodiment will be described below. In addition, the bearing device and the method of manufacturing the bearing device related to the first embodiment will be described below after the information recording/reproducing apparatus related to an embodiment is described.

Information Recording/Reproducing Apparatus

Figure 1:
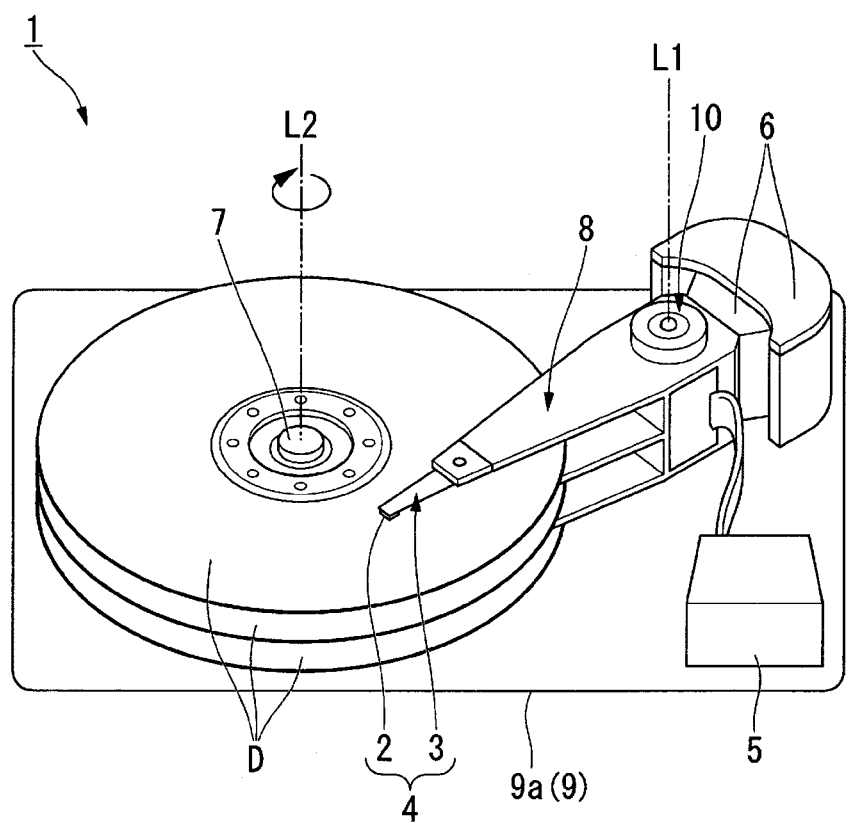
FIG. 1 is a perspective view of an information recording/reproducing apparatus related to an embodiment.

FIG. 1 is a perspective view of an information recording/reproducing apparatus 1 related to the embodiment.

As shown in FIG. 1, the information recording/reproducing apparatus 1 is an apparatus that performs writing and reading with respect to a disk (magnetic recording medium) D having a recording layer. The information recording/reproducing apparatus 1 includes an arm (rotating member) 8, a head gimbal assembly 4 that is supported on the tip side of the arm 8, a slider 2 that is mounted on the tip of the head gimbal assembly 4, an actuator (VCM: voice coil motor) 6 that moves the head gimbal assembly 4 in a scannable manner, a spindle motor 7 that rotates the disk D, a control unit 5 that supplies a current modulated according to information to the slider 2, and a housing 9 that houses these respective components therein.

The housing 9 is made of, for example, metallic materials, such as aluminum, iron, or stainless steel, is formed in the shape of a box having an opening portion at an upper portion thereof, and is constituted by a bottom portion 9a having a quadrangular shape in plan view, and a peripheral wall (not shown) that is erected perpendicularly from a peripheral edge portion of the bottom portion 9a. A housing recess that houses the above-described respective components is formed inside the housing 9 surrounded by the peripheral wall. The spindle motor 7 is attached to the substantial center of the bottom portion 9a, and the disk D is detachably fixed by fitting the center hole of the disk to the spindle motor 7.

A bearing device 10 is arranged at a side of the disk D. One end portion of the bearing device 10 is supported by the bottom portion 9a of the housing 9. The arm 8 is externally fitted and anchored to an outer peripheral surface of the bearing device 10. A base end portion of the arm 8 is connected to the above-described actuator 6. Additionally, the arm 8 extends parallel to the surface of the disk D from the base end side toward the tip side.

The head gimbal assembly 4 is connected to the tip of the arm 8. The head gimbal assembly 4 includes a suspension 3, and the slider 2 that is mounted on the tip of the suspension 3 and arranged opposite to the surface of the disk D. The slider includes a recording element that performs writing (recording) of information to the disk D, and a reproducing element that performs reading (reproducing) of information from the disk D.

In the information recording/reproducing apparatus 1 configured as described above, in order to perform recording or reproducing of information, first, the spindle motor 7 is driven to rotate the disk D around a central axis L2 of the disk D. Additionally, the actuator 6 is driven to rotate the arm 8 with the bearing device 10 as a rotation center. This enables the slider 2 arranged at the tip of the head gimbal assembly 4 to move to respective parts of the surface of the disk D in a scannable manner. Also, the recording or reproducing of information with respect to the disk D can be performed by driving the recording element or the reproducing element of the slider 2.

Bearing Device of First Embodiment

Figure 2:
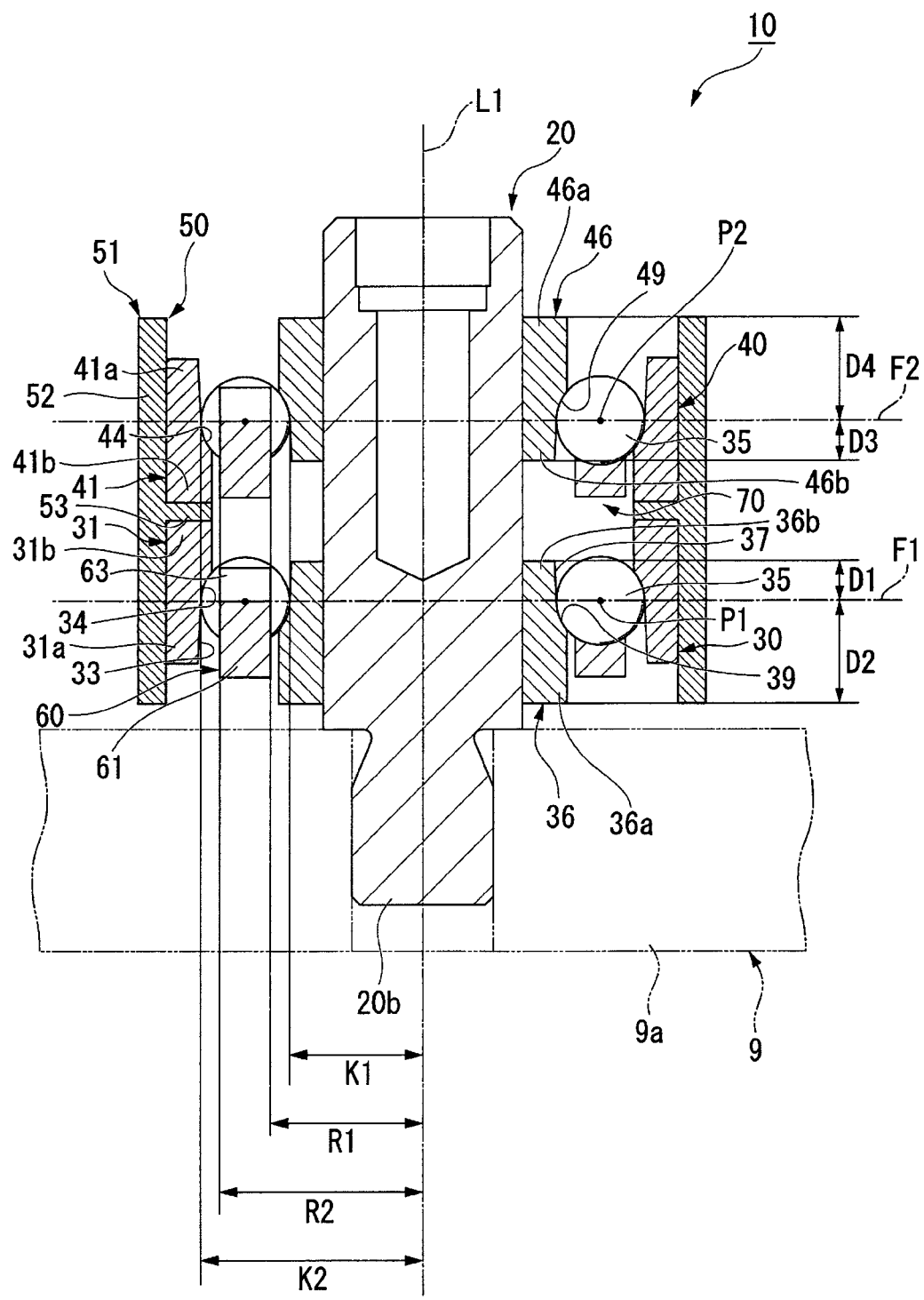
FIG. 2 is a side cross-sectional view of a bearing device related to a first embodiment.

FIG. 2 is a side cross-sectional view of the bearing device 10 related to the first embodiment. In addition, the housing 9 and the bottom, portion 9a of the housing 9 are shown by two-dot chain lines in FIG. 2. A direction along the axis (that is, the axis of a shaft 20; hereinafter referred to as a "central axis L1") of the bearing device 10 is hereinafter referred to as an "axial direction". Additionally, a bottom portion 9a side (that is, a lower side in FIG. 2) of the housing 9 shown in FIG. 1 in the axial direction is referred to as "one side", and an opening side (that is, an upper side in FIG. 2) of the housing 9 in the axial direction is referred to as the "other side". Additionally, an inner side of a pair of rolling bearing portions 30 and 40 in the axial direction is referred to as an "inner side in the axial direction", and an outer side of the pair of rolling bearing portions 30 and 40 in the axial direction is referred to as an "outer side in the axial direction". Additionally, a direction orthogonal to the central axis L1 is referred to as a "radial direction", and a direction circulating around the central axis L1 is referred to as a "circumferential direction". Additionally, an imaginary plane including a center P1 of the plurality of rolling elements 35 of the first rolling bearing portion 30 is defined as an imaginary plane F1, and an imaginary plane including a center P2 of the plurality of rolling elements 35 of the second rolling bearing portion 40 is defined as an imaginary plane F2.

As shown in FIG. 2, the bearing device 10 related to the first embodiment includes the shaft 20 erected from the bottom portion 9a of the housing 9, and the pair of rolling bearing portions 30 and 40 arranged side by side in the axial direction of the shaft 20.

The shaft 20, which is a member having a substantially columnar shape extending along the central axis L1, is formed of, for example, metallic materials, such as aluminum, iron, or stainless steel. A portion of the shaft 20 on the bottom portion 9a side of the housing 9 is defined as a base end portion, and a portion of the shaft opposite to the bottom portion in the axial direction is defined as a tip portion.

A diameter-reduced portion 20b that has a smaller diameter than the diameter of the shaft 20 is provided at the base end portion of the shaft 20 so as to protrude downward therefrom. The diameter-reduced portion 20b is formed with a male thread (not shown) that is threadedly attached to a female thread (not shown) formed in the bottom portion 9a of the housing 9. Also, the shaft 20 is erected from the bottom portion 9a of the housing 9 by the threaded attachment. In this case, the positioning of the shaft 20 in the height direction is performed as an end face of the shaft 20 on the base end side come into contact with the bottom portion 9a of the housing 9.

Rolling Bearing Portion

The pair of rolling bearing portions 30 and 40 are arranged side by side in the axial direction in the shaft 20, the first rolling bearing portion 30 out of the pair of rolling bearing portions 30 and 40 is arranged on one side of the shaft 20 in the axial direction, and the second rolling bearing portion 40 is arranged on the other side of the shaft 20 in the axial direction.

First Rolling Bearing Portion

The first rolling bearing portion 30 includes a first inner ring 36 that is arranged coaxially with the central axis L1 of the shaft 20, a first outer ring 31 that surrounds the first inner ring 36 from the outer side of the shaft 20 in the radial direction, the plurality of rolling elements 35 that are rollably retained between the first inner ring 36 and the first outer ring 31, and a first retainer 60 (equivalent to a "retainer" of the claims) that is capable of rollably retaining the plurality of rolling elements 35 and annularly and equally arranging the rolling elements.

In addition, hereinafter, the separation distance between an innermost portion of the plurality of rolling elements 35 in the radial direction and the central axis L1 is defined as a first separation distance K1, and the separation distance between an outermost portion of the plurality of rolling elements 35 in the radial direction and the central axis L1 is defined as a second separation distance K2.

First Inner Ring

The first inner ring 36 is a substantially cylindrical member made of, for example, metallic materials, such as stainless steel, and is formed, for example by forging, machining, or the like.

The first inner ring 36 is formed such that the external radius of an inner end portion 36b in the axial direction is smaller than the first separation distance K1.

An intermediate portion of an outer peripheral surface 37 of the first inner ring 36 in the axial direction is formed with an inner ring rolling surface 39. The inner ring rolling surface 39 has a side cross-section formed in a circular-arc shape so that the external diameter thereof becomes gradually larger than the first separation distance K1 from the inner side toward the outer side in the axial direction. The inner ring rolling surface 39 is formed over the entire circumference of the outer peripheral surface 37 of the first inner ring 36, and is enabled to abut against the outer surfaces of the plurality of rolling elements 35 arranged annularly.

The internal diameter of the first inner ring 36 is formed with a dimension such that the first inner ring can be inserted into the shaft 20. In the present embodiment, the internal diameter of the first inner ring 36 is formed so as to become slightly larger than the external diameter of the shaft 20. The first inner ring 36 is inserted into the shaft 20, and is fixed to one side of the shaft 20 in the axial direction with, for example, an adhesive or the like, with a clearance between an outer end portion 36a and the bottom portion 9a of the housing 9. In addition, the internal diameter of the first inner ring 36 may be formed so as to become equal to or slightly smaller than the external diameter of the shaft 20. In this case, the first inner ring 36 is inserted into the shaft 20 and press-fitted and fixed thereto.

The first inner ring 36 has an external diameter that becomes larger from the inner side toward the outer side in the axial direction, and has a uniform internal diameter. Accordingly, forging is suitable when the outer shape of the first inner ring 36 is formed. Also, since the number of steps of performing machining can be significantly reduced by cutting the inner ring rolling surface 39 after the outer shape of the first inner ring 36 is formed by forging, manufacturing cost can be reduced.

Additionally, the first inner ring 36 is formed so that a distance D1 from the imaginary plane F1 to the inner end portion 36b in the axial direction becomes shorter than a distance D2 from the imaginary plane F1 to the outer end portion 36a in the axial direction. Since this can shorten the axial length of the first inner ring 36, further reduction in size, weight, and cost of the bearing device 10 can be performed.

First Outer Ring

The first outer ring 31, similar to the first inner ring 36, is a substantially cylindrical member made of, for example, metallic materials, such as stainless steel, and is formed, for example by forging, machining, or the like.

The first outer ring 31 is formed such that the internal radius of an outer end portion 31a in the axial direction is larger than the second separation distance K2.

An intermediate portion of an inner peripheral surface 33 of the first outer ring 31 in the axial direction is formed with an outer ring rolling surface 34. The outer ring rolling surface 34 has a side cross-section formed in a circular-arc shape so that the internal diameter thereof becomes gradually smaller than the second separation distance K2 from the outer side toward the inner side in the axial direction. The outer ring rolling surface 34 is formed over the entire circumference of the inner peripheral surface 33 of the first outer ring 31, and is enabled to abut against the outer surfaces of the plurality of rolling elements 35 arranged annularly.

The outer peripheral surface of the first outer ring 31 is formed so as to have a uniform external diameter in the axial direction.

Additionally, the outer end portion 31a of the first outer ring 31 in the axial direction is arranged further toward the inner side in the axial direction than the outer end portion 36a of the first inner ring 36, and is arranged further toward the outer side than an abutting portion between the outer ring rolling surface 34 and the rolling elements 35 to be described below. Since this can shorten the axial length of the first outer ring 31, further reduction in size, weight, and cost of the bearing device 10 can be performed.

Rolling Element

The rolling elements 35 are spherically formed of a metallic material. The rolling elements 35 are arranged between the outer ring rolling surface 34 of the first outer ring 31 and the inner ring rolling surface 39 of the first inner ring 36, and are adapted to roll along the respective rolling surfaces 34 and 39. Each of the rolling surfaces 34 and 39 is formed so that the curvature radius thereof becomes slightly larger than the curvature radius of the external surfaces of the rolling elements 35. The plurality of rolling elements 35 are rollably, annularly and equally arranged along the circumferential direction by the first retainer 60.

First Retainer

Figure 3:
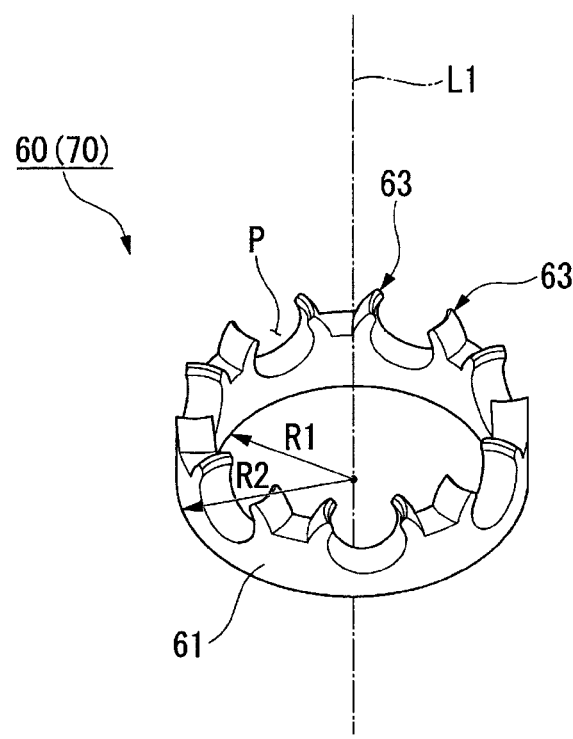
FIG. 3 is a perspective view of a first retainer and a second retainer.

FIG. 3 is a perspective view of the first retainer 60 and the second retainer 70.

The first retainer 60 is a member that rollably retains the rolling elements 35 while rotating around the central axis L1 by the guidance by the first outer ring 31, the first inner ring 36, and the rolling elements 35 and that is made of, for example, resin or the like, and includes a body portion 61 and a plurality of claw portion pairs 63 that are formed integrally with the body portion 61.

As shown in FIG. 3, the body portion 61 is formed in an annular shape that surrounds the first inner ring 36 from the outer side in the radial direction. Spherical ball pockets P that allow the rolling elements 35 to be inserted thereinto are formed in a recessed manner, for example, in seven places at regular intervals in the circumferential direction on the other side of the body portion 61 in the axial direction.

The plurality of (seven in the present embodiment) claw portion pairs 63 are provided on the body portion 61 so as to correspond to the ball pockets P, respectively. The claw portion pairs 63 can rollably retain the rolling elements 35 inserted into the ball pockets P. As for the claw portion pairs 63, claw portions of each of the plurality of claw portion pairs 63 are erected along the central axis L1 (axial direction) from the body portion 61, face each other in the circumferential direction with each ball pocket P interposed therebetween, and are raised so as to be curved in a circular-arc shape so that the mutual distance therebetween decreases from a base end toward a tip.

As shown in FIG. 2, the plurality of (seven in the present embodiment) rolling elements 35 are retained in a state where the rolling elements are arranged at substantially regular intervals in the circumferential direction by the ball pockets P of the first retainer 60 (refer to FIG. 3), and are arranged between the first inner ring 36 and the first outer ring 31.

Here, the first retainer 60 is formed so that the internal radius R1 thereof becomes larger than the maximum external radius of the first inner ring 36, and the first retainer 60 is formed so that the external radius R2 thereof becomes smaller than the minimum internal radius of the first outer ring 31. By forming the first retainer 60 in this way, the plurality of rolling elements 35 can be arranged between the inner ring rolling surface 39 of the first inner ring 36 and the outer ring rolling surface 34 of the first outer ring 31 without interference between the first retainer 60, and the first inner ring 36 and the first outer ring 31.

Second Rolling Bearing Portion

The second rolling bearing portion 40 includes a second inner ring 46 that is arranged coaxially with the central axis L1 of the shaft 20, a second outer ring 41 that surrounds the second inner ring 46 from the outer side of the shaft 20 in the radial direction, a plurality of rolling elements 35 that are rollably retained between the second inner ring 46 and the second outer ring 41, and a second retainer 70 that rollably, annularly, and equally arranges the plurality of rolling elements 35. In the present embodiment, the second inner ring 46 and the second outer ring 41 of the second rolling bearing portion 40 are respectively formed in a plane symmetrical shape with respect to the first inner ring 36 and the first outer ring 31 of the first rolling bearing portion 30. Additionally, the second retainer 70 is the same member as the first retainer 60 (refer to FIG. 3). Accordingly, the detailed description of the second rolling bearing portion 40 will be omitted.

Sleeve

In the present embodiment, the first outer ring 31 and the second outer ring 41 are fixed by a sleeve 51 so as to be immovable relative to each other. The sleeve 51 is a member made of, for example, metallic materials, such as aluminum, iron, or stainless steel, and is formed, for example by forging, machining, or the like. The sleeve 51 includes a cylindrical main body cylinder portion 52, and a spacer portion 53 that overhangs to the inner side in the radial direction at an intermediate portion of the main body cylinder portion 52 in the axial direction.

The internal diameter of the sleeve 51 is formed so as to become larger than the external diameter of the first outer ring 31 and the second outer ring 41 so that the first outer ring 31 and the second outer ring 41 excluding the spacer portion 53 can be inserted into and arranged in the inside of the main body cylinder portion 52. Additionally, the outer end portions of the sleeve 51 on one side and the other side are arranged further toward the outer side in the axial direction than the outer end portion 31a of the first outer ring 31 and the outer end portion 41a of the second outer ring 41, respectively. The axial length of the sleeve 51 is appropriately set according to the number of arms 8, or the like.

The spacer portion 53 has a predetermined thickness in the axial direction and is formed so that the internal diameter thereof is approximately equal to, for example, the internal diameter of the first outer ring 31 and the second outer ring 41.

The first outer ring 31 and the second outer ring 41 can be arranged in a state where the rings are spaced apart from each other by a predetermined interval in the axial direction by interposing the spacer portion 53 between opposed end faces of the outer rings 31 and 41. Moreover, in a preload applying step S25 (refer to FIG. 11) to be described below, when the first inner ring 36 and the second inner ring 46 are relatively pressed in the axial direction, a preload can be applied to the first inner ring 36 and the second inner ring 46 by shortening the separation distance between the first inner ring 36 and the second inner ring 46 while retaining the separation distance between the first outer ring 31 and the second outer ring 41 by the spacer portion 53.

The first outer ring 31 is inserted into the sleeve 51 from one side, the second outer ring 41 is inserted into the sleeve from the other side, and the first and second rings are fixed with an adhesive or the like in a state where the opposed end faces of the rings are butted against the spacer portion 53, respectively. As a result, the sleeve 51, the first outer ring 31, and the second outer ring 41 are integrally formed to constitute an outer ring assembly 50.

By including the sleeve 51, the external diameter of the bearing device 10 can be made uniform. Accordingly, since the arm 8 (refer to FIG. 1) can be mounted on the bearing device 10 with high precision, the high-performance information recording/reproducing apparatus 1 (refer to FIG. 1) can be formed. Additionally, even if the arm 8 (refer to FIG. 1) is externally fitted to the sleeve 51, relative deviation does not occur at the central axis of the first outer ring 31 and the second outer ring 41.

The first rolling bearing portion 30 and the second rolling bearing portion 40 formed as described above are arranged side by side in the axial direction of the shaft 20 so that the inner end portion 36b of the first inner ring 36 and an inner end portion 46b of the second inner ring 46 do not interfere with each other. Moreover, the first inner ring 36 of the first rolling bearing portion 30 and the second inner ring 46 of the second rolling bearing portion 40 are fixed to the sleeve 51 in a state where preload is applied.

Method of Manufacturing Bearing Device

Next, a method of manufacturing the bearing device 10 of the present embodiment will be described.

Figure 4:
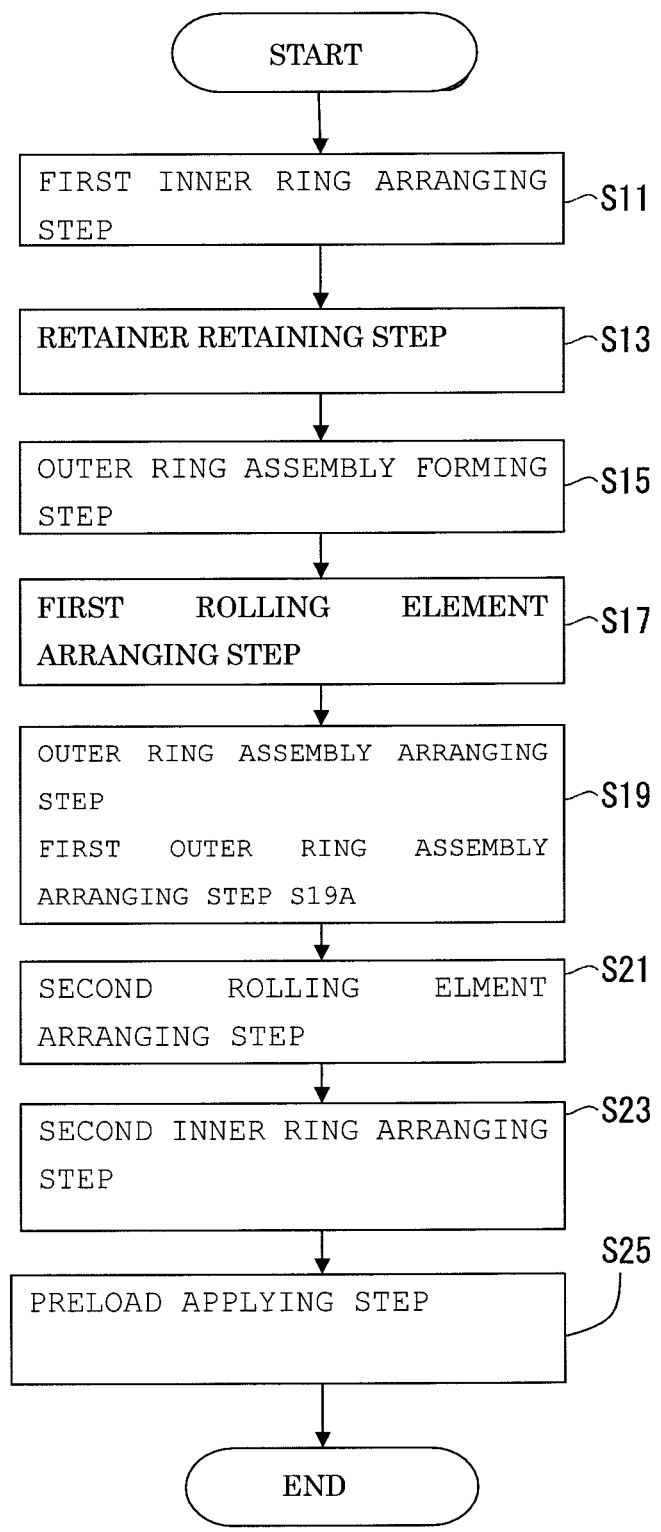
FIG. 4 is a flowchart of a process of manufacturing the bearing device.

FIG. 4 is a flowchart of a process (method) of manufacturing the bearing device 10.

As shown in FIG. 4, the process of manufacturing the bearing device 10 includes a first inner ring arranging step S11 (equivalent to a "first arranging step" of the claims), a retainer retaining step S13, an outer ring assembly forming step S15 (equivalent to a "second arranging step", a "first outer ring arranging step", a "third arranging step", and a "second outer ring arranging step" of the claims), a first rolling element arranging step S17, an outer ring assembly arranging step S19, a second rolling element arranging step S21, a second inner ring arranging step S23 (equivalent to a "fourth arranging step" of the claims), and a preload applying step S25. The respective steps will be described below.

First Inner Ring Arranging Step S11

Figure 5:
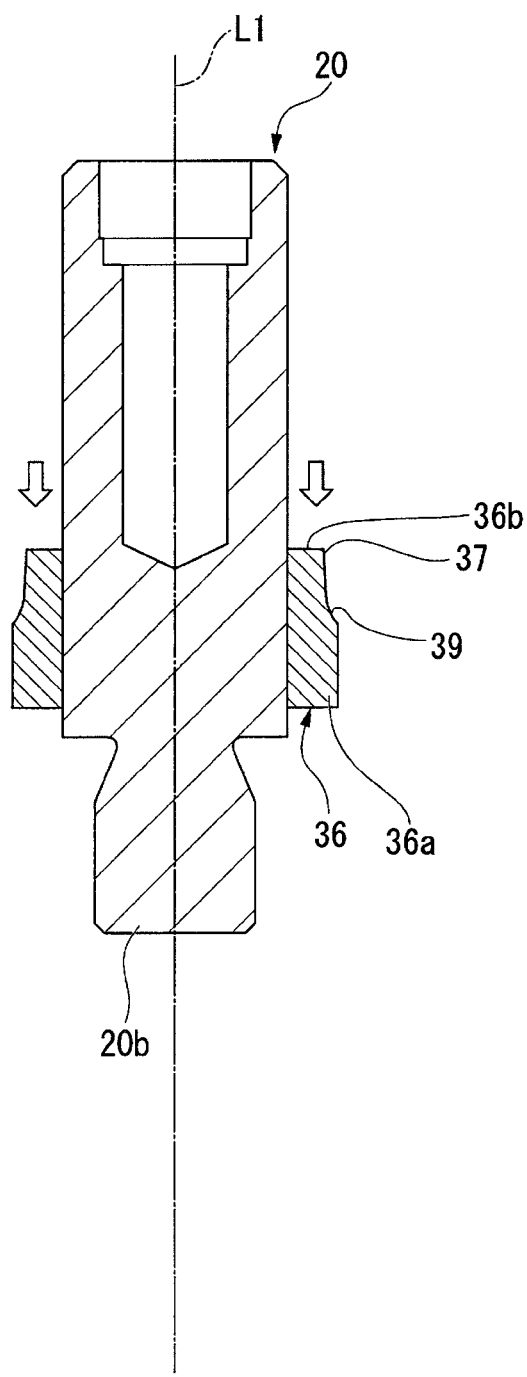
FIG. 5 is an explanatory view of a first inner ring arranging step.

FIG. 5 is an explanatory view of the first inner ring arranging step S11.

First, as shown in FIG. 5, the first inner ring arranging step S11 of inserting the first inner ring 36 of the first rolling bearing portion 30 out of the first inner ring 36 and the second inner ring 46 of the pair of rolling bearing portions 30 and 40 (refer to FIG. 2) into the shaft 20 to arrange the first inner ring on one side in the axial direction is performed.

In the first inner ring arranging step S11, the shaft 20 is arranged at a jig (not shown) in an erected state, and the outer peripheral surface of the shaft 20 is coated with an adhesive. Next, the first inner ring 36 is inserted into the shaft 20 in the axial direction from the other side in the axial direction in a state where the inner end portion 36b of the first inner ring 36 is arranged on the other side in the axial direction. Next, the first inner ring 36 is pushed in and arranged at a predetermined position closer to the other side than the diameter-reduced portion 20b of the shaft 20. Thereafter, the adhesive is solidified and the first inner ring 36 is fixed to one side of the shaft 20 in the axial direction. That completes the first inner ring arranging step S11.

Retainer Retaining Step S13

Figure 6:
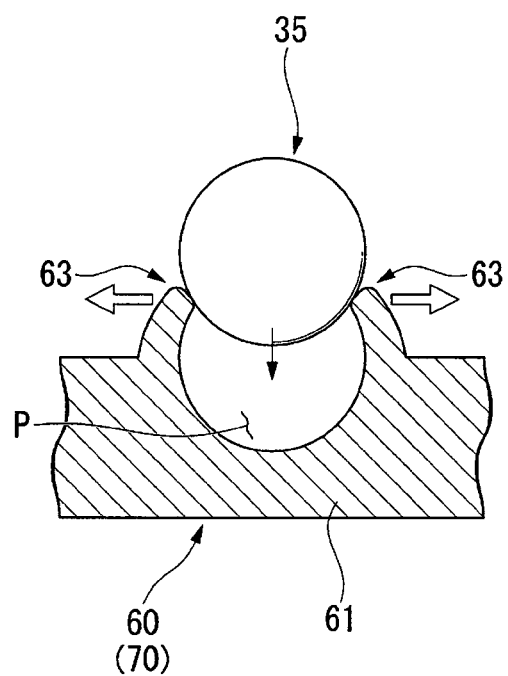
FIG. 6 is an explanatory view of a retainer retaining step.

FIG. 6 is an explanatory view of the retainer retaining step S13.

Subsequently, as shown in FIG. 6, the retainer retaining step S13 of making the first retainer 60 and the second retainer 70 rollably retain the plurality of rolling elements 35, respectively, and annularly and equally arrange the rolling elements is performed.

In the retainer retaining step S13, a rolling element 35 is pushed in between a pair of claw portions 63 of the first retainer 60, and the rolling element 35 is assembled into a ball pocket P of the body portion 61 of the first retainer 60. The pair of claw portions 63 are elastically deformed to the outer side by a pressing force when the rolling element 35 is pushed in. This enables the rolling element 35 to be inserted between the pair of claw portions 63 and assembled into the ball pocket P. Additionally, since the pair of claw portions 63 are elastically restored and deformed to their original state and the aperture becomes narrow if the rolling element 35 is inserted into the ball pocket P, the rolling element 35 can be rollably retained by the pair of claw portions 63 without falling off within the ball pocket P. Similarly, by assembling a plurality of (seven in the present embodiment) the rolling elements 35 into the first retainer 60, the plurality of rolling elements 35 are rollably retained by the first retainer 60 in a state where the rolling elements are equally arranged in the circumferential direction. Moreover, similarly, when the plurality of (seven in the present embodiment) rolling elements 35 are assembled into the second retainer 70, the retainer retaining step S13 is completed.

In addition, the retainer retaining step S13 may be performed before the first inner ring arranging step S11. Additionally, in the present embodiment, the assembling of the rolling elements 35 into the first retainer 60 and the second retainer 70 is performed in one step (retainer retaining step S13), but may be performed in separate steps. Specifically, the retainer retaining step may be divided into a first retainer retaining step of assembling the rolling elements 35 into the first retainer 60, and a second retainer retaining step of assembling the rolling elements 35 into the second retainer 70, and the respective retainer retaining steps may be performed at different timings.

Outer Ring Assembly Forming Step S15

Figure 7:
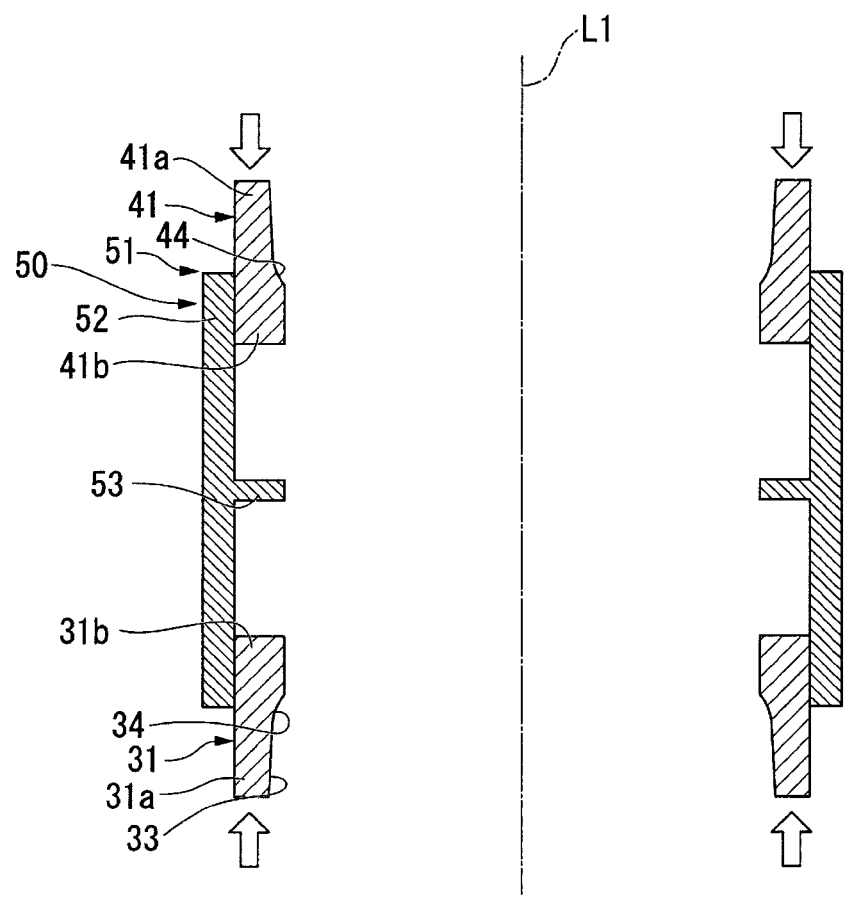
FIG. 7 is an explanatory view of an outer ring assembly forming step.

FIG. 7 is an explanatory view of the outer ring assembly forming step S15.

Subsequently, as shown in FIG. 7, the outer ring assembly forming step S15 of fixing the first outer ring 31 and the second outer ring 41 to the sleeve 51, respectively, so as to be immovable relative to each other and forming the outer ring assembly 50 is performed.

In the outer ring assembly forming step S15, first, an inner peripheral surface of the main body cylinder portion 52 of the sleeve 51 is coated with an adhesive. As the adhesive coated on the inner peripheral surface of the main body cylinder portion 52 of the sleeve 51, for example, an anaerobic adhesive is suitable. Next, the first outer ring 31 is inserted into the inside of the sleeve 51 from one side toward the other side in the axial direction, and the second outer ring 41 is inserted from the other side toward one side in the axial direction. Then, the inner end portion 31b of the first outer ring 31 and the inner end portion 41b of the second outer ring 41 are pushed in until opposed end faces of the inner end portions are butted against the spacer portion 53, respectively. When the adhesive hardens, the sleeve 51, the first outer ring 31, and the second outer ring 41 are integrally formed to constitute the outer ring assembly 50. That completes the outer ring assembly forming step S15.

In addition, the outer ring assembly forming step S15 only has to be performed at least before the outer ring assembly arranging step S19. Additionally, in the present embodiment, the assembling of the first outer ring 31 and the second outer ring 41 to the sleeve 51 is performed in one step (outer ring assembly forming step S15), but may be divided into and performed in separate steps.

First Rolling Element Arranging Step S17

Figure 8:
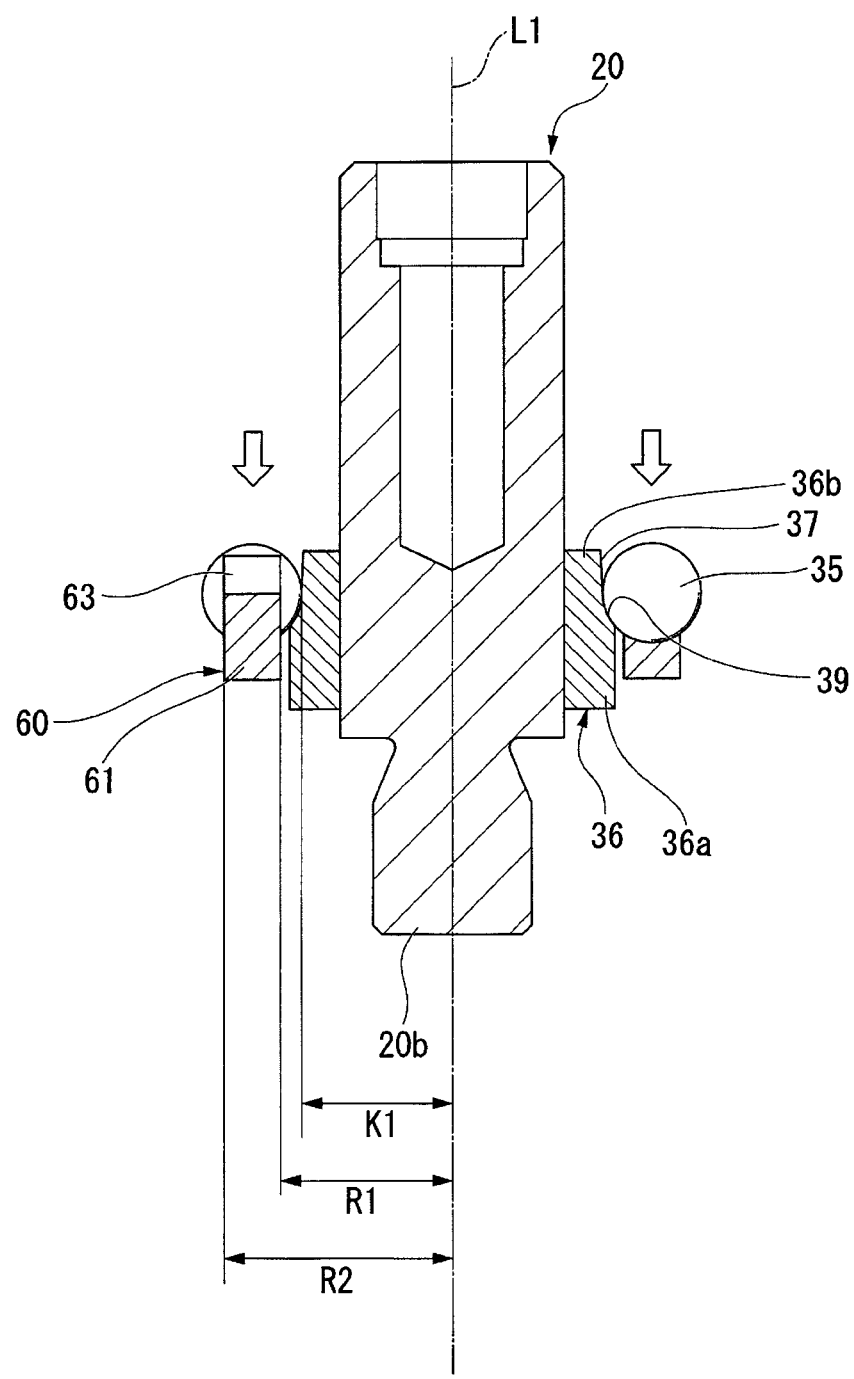
FIG. 8 is an explanatory view of a first rolling element arranging step.

FIG. 8 is an explanatory view of the first rolling element arranging step S17.

Subsequently, as shown in FIG. 8, the first rolling element arranging step S17 of inserting the plurality of rolling elements 35 into the first inner ring 36 together with the first retainer 60 from the other side in the axial direction and placing the plurality of rolling elements 35 on the inner ring rolling surface 39 of the first inner ring 36 is performed.

Here, since the first retainer 60 is formed so that the internal radius R1 thereof is larger than the maximum external radius of the first inner ring 36, the rolling elements 35 can be inserted together with the first retainer 60 from the other side in the axial direction and placed on the inner ring rolling surface 39, without interference between the first retainer 60 and the first inner ring 36 in a state where the rolling elements 35 are retained by the first retainer 60 and annularly and equally arranged. Additionally, the inner end portion 36b of the first inner ring 36 is formed so that the external radius thereof is smaller than the first separation distance K1. Accordingly, in the first rolling element arranging step S17, the plurality of rolling elements 35 can be easily inserted together with the first retainer 60 from the other side in the axial direction without interfering with the inner end portion 36b of the first inner ring 36. Additionally, the inner ring rolling surface 39 of the first inner ring 36 is formed so as to have an external radius that becomes gradually larger than the first separation distance K1 from the inner side toward the outer side in the axial direction (that is, from the other side toward one side in the axial direction). Accordingly, in the first rolling element arranging step S17, the plurality of rolling elements 35 can be easily placed on the inner ring rolling surface 39 by inserting the plurality of rolling elements 35 into the first inner ring 36 together with the first retainer 60 from the other side in the axial direction. Moreover, since the plurality of rolling elements 35 are equally arranged and retained by the first retainer 60 so as to be immovable relative to each other, the plurality of rolling elements 35 can be retained in a state where the rolling elements are placed on the inner ring rolling surface 39, without using a jig or the like. In this way, according to the first rolling element arranging step S17 of the present embodiment, the plurality of rolling elements 35 can be easily arranged on the outer side of the first inner ring 36 in the radial direction. That completes the first rolling element arranging step S17.

Outer Ring Assembly Arranging Step S19

Figure 9:
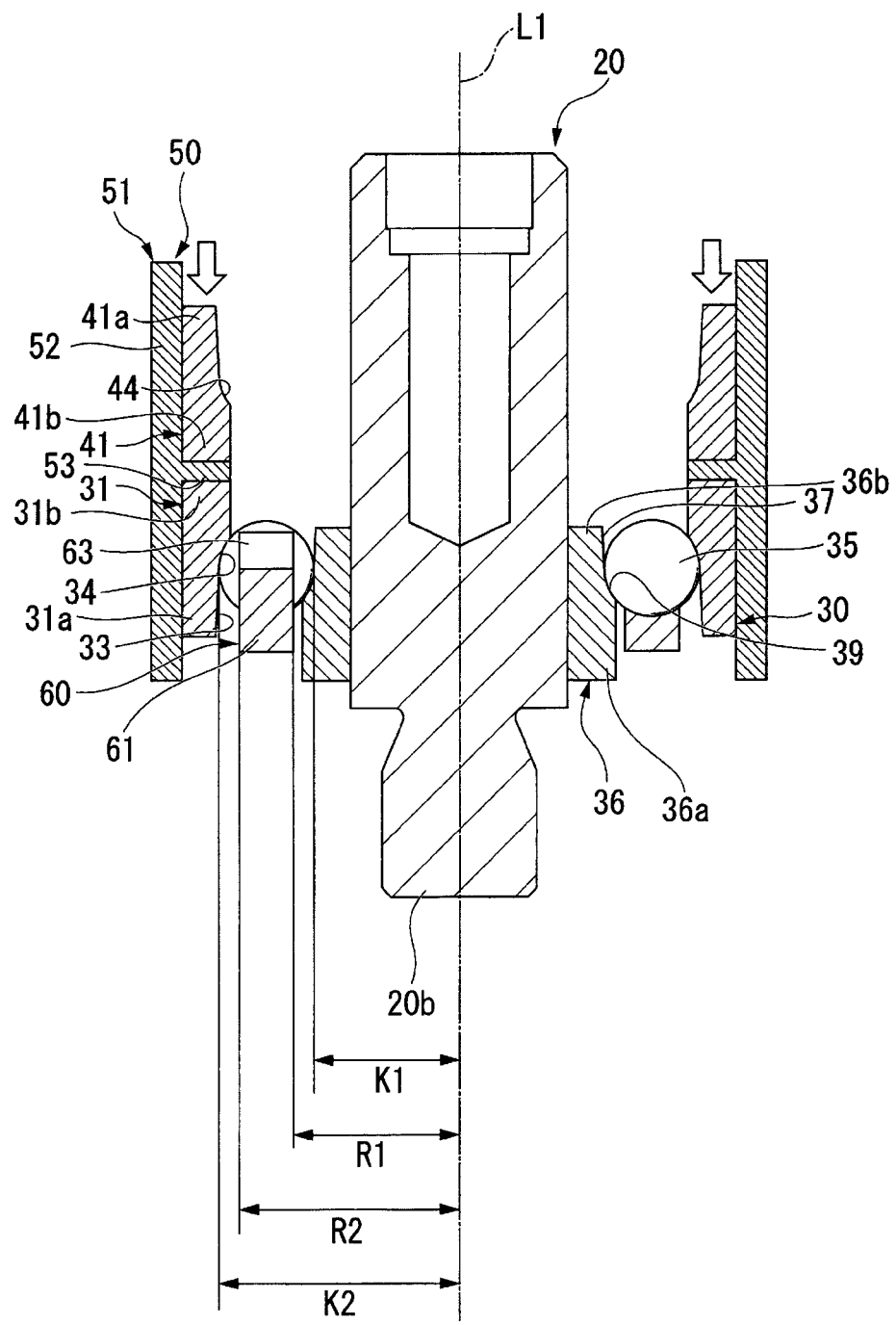
FIG. 9 is an explanatory view of an outer ring assembly arranging step.

FIG. 9 is an explanatory view of the outer ring assembly arranging step S19.

Subsequently, as shown in FIG. 9, the outer ring assembly arranging step S19 of inserting the outer ring assembly 50 into the first inner ring 36 from the other side in the axial direction is performed.

Here, since the external radius R2 of the first retainer 60 is formed so as to become smaller than the minimum internal radius of the first outer ring 31, the rolling elements 35 can be simply made to abut against the outer ring rolling surface 34 without interference between the first retainer 60 and the first outer ring 31 by inserting the first outer ring 31 in a state where the rolling elements 35 are annularly and equally arranged.

Additionally, the outer end portion 31a of the first outer ring 31 is formed so that the external radius thereof is larger than the second separation distance K2. Accordingly, in the outer ring assembly arranging step S19, the first outer ring 31 can be easily inserted into the first inner ring 36 from the other side in the axial direction without interfering with the plurality of rolling elements 35. Additionally, the outer ring rolling surface 34 of the first outer ring 31 is formed so as to have an internal radius that becomes gradually smaller than the second separation distance K2 from the outer side toward the inner side in the axial direction (that is, from one side toward the other side in the axial direction). Accordingly, in the outer ring assembly arranging step S19, when the outer ring assembly 50 is inserted into the first inner ring 36 from the other side in the axial direction, the outer ring rolling surface 34 of the first outer ring 31 can be made to abut against the plurality of rolling elements 35. Since this allows the outer ring assembly 50 to be positioned at a predetermined position in the axial direction, the outer ring assembly 50 can be retained in a state where the outer ring rolling surface 34 abuts against the plurality of rolling elements 35, without using a jig or the like.

In addition, in the present embodiment, since the sleeve 51, the first outer ring 31, and the second outer ring 41 are integrally formed to constitute the outer ring assembly 50, the outer ring rolling surface 34 of the first outer ring 31 can be made to abut against the rolling elements 35 and the second outer ring 41 can be arranged on the other side in the axial direction by inserting the outer ring assembly 50 into the first inner ring 36 from the other side in the axial direction. That is, in the outer ring assembly arranging step S19, a first outer ring arranging step S19A of arranging the first outer ring 31 on the outer side of the first inner ring 36 in the radial direction and making the outer ring rolling surface 34 of the first outer ring 31 abut against the rolling elements 35, and a second outer ring arranging step S19B of arranging the second outer ring 41 on the other side in the axial direction are simultaneously performed.

In this way, according to the outer ring assembly arranging step S19 of the present embodiment, the outer ring assembly 50 constituted of the sleeve 51, the first outer ring 31, and the second outer ring 41 can be easily arranged on the outer side of the first inner ring 36 in the radial direction. That completes the outer ring assembly arranging step S19.

Second Rolling Element Arranging Step S21

Figure 10:
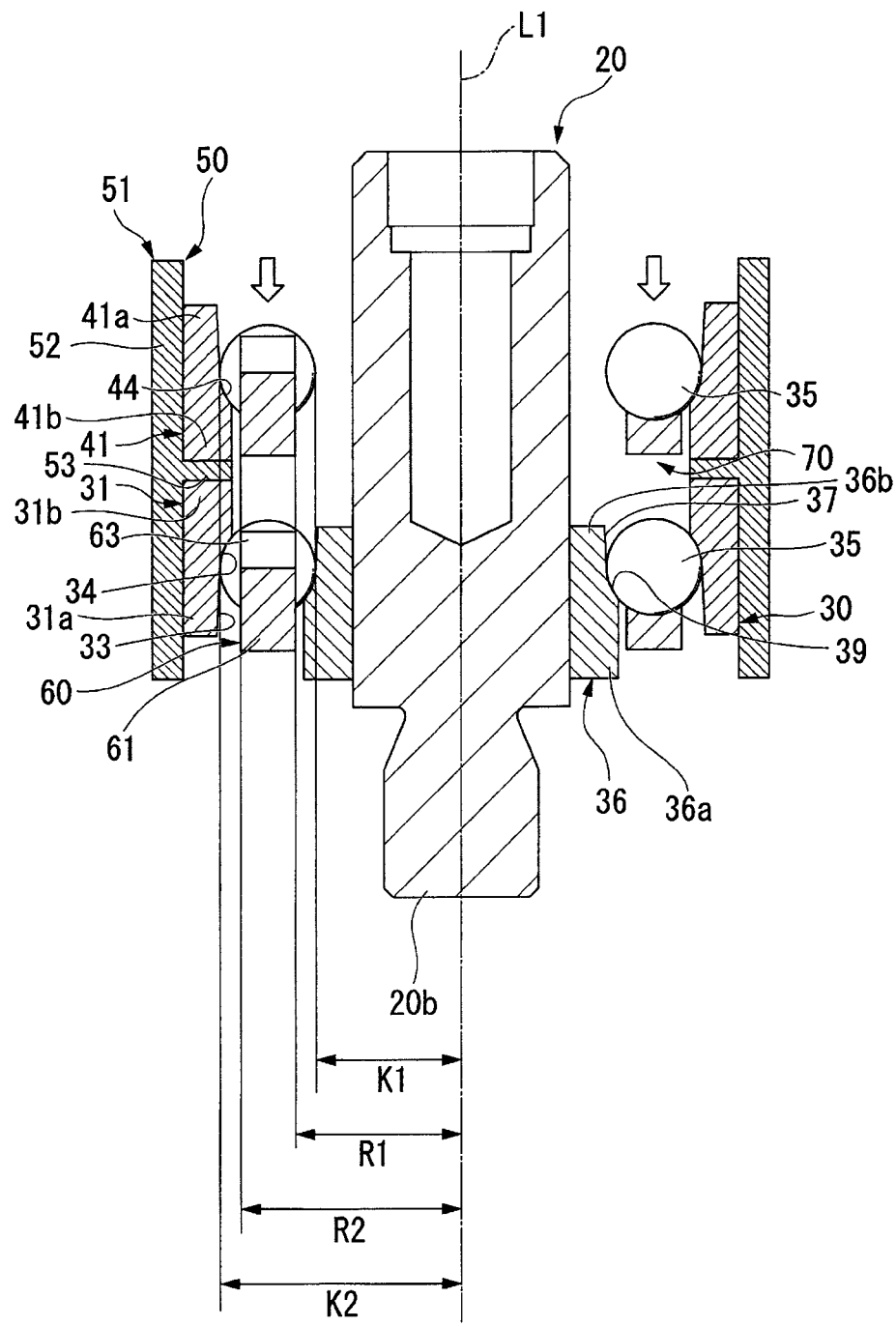
FIG. 10 is an explanatory view of a second rolling element arranging step.

FIG. 10 is an explanatory view of the second rolling element arranging step S21. Subsequently, as shown in FIG. 10, the second rolling element arranging step S21 of inserting the plurality of rolling elements 35 into the second outer ring 41 of the outer ring assembly 50 together with the second retainer 70 from the other side in the axial direction and placing the plurality of rolling elements 35 on the outer ring rolling surface 44 on the other side in the axial direction is performed.

Here, since the external radius R2 of the second retainer 70 is formed so as to become smaller than the minimum internal radius of the second outer ring 41, the rolling elements 35 can be easily placed on the outer ring rolling surface 44 without interference between the second retainer 70 and the first outer ring 31 by inserting the rolling elements 35 into the second outer ring 41 in a state where the rolling elements are annularly and equally arranged.

Additionally, the outer end portion 41a of the second outer ring 41 arranged on the other side in the axial direction is formed so as to have an internal radius that is larger than the second separation distance K2. Accordingly, in the second rolling element arranging step S21, the plurality of rolling elements 35 can be easily inserted together with the second retainer 70 from the other side in the axial direction without interfering with the outer end portion 41a of the second outer ring 41. Additionally, the outer ring rolling surface 44 of the second outer ring 41 arranged on the other side in the axial direction is formed so as to have an internal radius that becomes gradually smaller than the second separation distance K2 from the outer side toward the inner side in the axial direction (that is, from the other side toward one side in the axial direction). Accordingly, in the second rolling element arranging step S21, the plurality of rolling elements 35 can be easily placed on the outer ring rolling surface 44 by inserting the plurality of rolling elements 35 into the second outer ring 41 together with the second retainer 70 from the other side in the axial direction. Moreover, since the plurality of rolling elements 35 are equally arranged and retained so as to be immovable relative to each other by the second retainer 70, the plurality of rolling elements 35 can be retained in a state where the rolling elements are placed on the outer ring rolling surface 44 of the second outer ring 41, without using a jig or the like. In this way, according to the second rolling element arranging step S21 of the present embodiment, the plurality of rolling elements 35 can be easily arranged on the inner side of the second outer ring 41 in the radial direction. That completes the second rolling element arranging step S21.

Second Inner Ring Arranging Step S23

Figure 11:
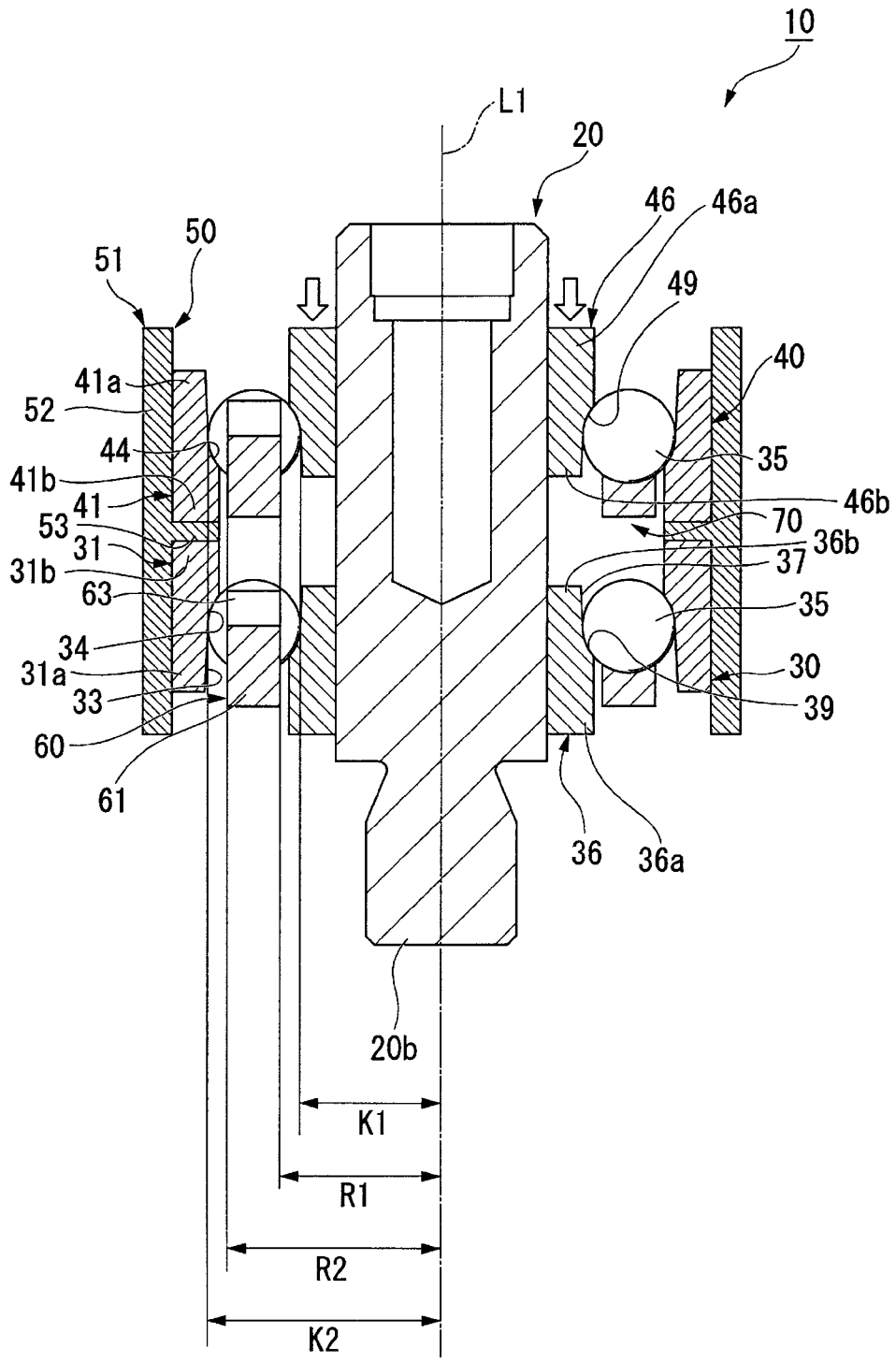
FIG. 11 is an explanatory view of a second inner ring arranging step and a preload applying step.

FIG. 11 is an explanatory view of the second inner ring arranging step S23 and the preload applying step S25. Subsequently, as shown in FIG. 11, the second inner ring arranging step S23 of inserting the second inner ring 46 of the second rolling bearing portion 40 out of the first inner ring 36 and the second inner ring 46 of the pair of rolling bearing portions 30 and 40 into the shaft 20 to arrange the second inner ring on the other side in the axial direction is performed. In the second inner ring arranging step S23, the second inner ring 46 is inserted in the axial direction from the other side of the shaft 20 in a state where the inner end portion 46b of the second inner ring 46 is arranged on one side.

Here, since the internal radius R1 of the second retainer 70 is formed so as to become larger than the minimum external radius of the second inner ring 46, the rolling elements 35 can be simply made to abut against the inner ring rolling surface 49 without interference between the second retainer 70 and the second inner ring 46 by inserting the second inner ring 46 in a state where the rolling element 35 is annularly and equally arranged.

Additionally, the inner end portion 46b of the second inner ring 46 arranged on one side in the axial direction is formed so that the external radius thereof is smaller than the first separation distance K1. Accordingly, in the second inner ring arranging step S23, the inner end portion 46b of the second inner ring 46 can be easily inserted from the other side in the axial direction without interfering with the plurality of rolling elements 35. Additionally, the inner ring rolling surface 49 of the second inner ring 46 is formed so as to have an external radius that becomes gradually larger than the first separation distance K1 from the inner side toward the outer side in the axial direction (that is, from one side toward the other side in the axial direction). Accordingly, in the second inner ring arranging step S23, when the second inner ring 46 is inserted into the shaft 20 from the other side in the axial direction, the inner ring rolling surface 49 of the second inner ring 46 can be made to abut against the plurality of rolling elements 35. Since this allows the second inner ring 46 to be positioned at a predetermined position in the axial direction, the second inner ring 46 can be retained in a state where the inner ring rolling surface 49 abuts against the plurality of rolling elements 35, without using a jig or the like. In this way, according to the second inner ring arranging step S23 of the present embodiment, the second inner ring 46 can be easily arranged on the outer side of the shaft 20 in the radial direction. This completes the second inner ring arranging step S23.

Preload Applying Step S25

Subsequently, the preload applying step S25 of fixing the first inner ring 36 and the second inner ring 46 to the shaft 20 while relatively pressing the first inner ring and the second inner ring in the axial direction is performed. In the present embodiment, the first inner ring 36 and the second inner ring 46 are relatively pressed by pressing the second inner ring 46 from the other side toward one side (that is, toward the first inner ring 36 side) in a state where the first inner ring 36 is fixed. In addition, the pressing of the second inner ring 46 is performed using a jig (not shown).

By pressing the second inner ring 46 of the second rolling bearing portion 40, the separation distance between the first inner ring 36 of the first rolling bearing portion 30 and the second inner ring 46 of the second rolling bearing portion 40 becomes short. Here, the first outer ring 31 of the first rolling bearing portion 30 and the second outer ring 41 of the second rolling bearing portion 40 are fixed to and formed integrally with the sleeve 51. Accordingly, by pressing the second inner ring 46 toward one side, the rolling elements 35 of the second rolling bearing portion 40 press the outer ring rolling surface 44 of the second outer ring 41, and the first outer ring 31 is pressed toward one side. Additionally, as the first outer ring 31 is pressed toward one side, the rolling elements 35 of the first rolling bearing portion 30 are pressed against the outer ring rolling surface 34 of the first outer ring 31 to press the inner ring rolling surface 39 of the first inner ring 36.

By pressing the second inner ring 46 of the second rolling bearing portion 40 in the axial direction from the other side toward one side in this way, a preload is applied to the first inner ring 36 of the first rolling bearing portion 30 and the second inner ring 46 of the second rolling bearing portion 40. Then, the second inner ring 46 of the second rolling bearing portion 40 is pressed until the adhesive hardens.

When the adhesive hardens, the preload applying step S25 is completed and the bearing device 10 related to the present embodiment is completed.

In addition, adhesives are respectively used in the first inner ring arranging step S11, the outer ring assembly forming step S15, and the second inner ring arranging step S23 of the present embodiment, whereby the first inner ring 36 and the second inner ring 46 are fixed to the shaft 20 and the first outer ring 31 and the second outer ring 41 are fixed to the sleeve 51. In contrast, for example, through press-fitting, laser welding, or the like, the first inner ring 36 and the second inner ring 46 may be fixed to the shaft 20 and the first outer ring 31 and the second outer ring 41 may be fixed to the sleeve 51. This enables the first inner ring 36 and the second inner ring 46 to be fixed to the shaft 20 and enables the first outer ring 31 and the second outer ring 41 to be fixed to the sleeve 51, without using an adhesive. Accordingly, generation of outgas from the adhesive can be prevented and defects of the information recording/reproducing apparatus 1 resulting from the outgas can be prevented.

Effects of First Embodiment

According to the present embodiment, since the first inner ring 36 of the first rolling bearing portion 30 includes the inner ring rolling surface 39 formed so that the external radius of the inner end portion 36b in the axial direction is smaller than the first separation distance K1 and so as to have an external radius that becomes gradually larger than the first separation distance K1 from the inner side toward the outer side in the axial direction, and the first retainer 60 of the first rolling bearing portion 30 is formed so that the internal radius R1 is larger than the maximum external radius of the first inner ring 36, the rolling elements 35 can be inserted from the inner end portion 36b in the axial direction together with the first retainer 60 and placed on the inner ring rolling surface 39, without interference between the first retainer 60 and the first inner ring 36 in a state where the rolling elements 35 are retained by the first retainer 60 and annularly and equally arranged.

Additionally, the second outer ring 41 of the second rolling bearing portion 40 includes the outer ring rolling surface 44 formed so that the internal radius of the outer end portion 41a in the axial direction become larger than the second separation distance K2 and so as to have an internal radius that becomes gradually smaller than the second separation distance K2 from the outer side toward the inner side in the axial direction, and the second retainer 70 of the second rolling bearing portion 40 is formed so that the external radius R2 becomes smaller than the minimum internal radius of the second outer ring 41, the rolling elements 35 can be inserted from the outer end portion 41a in the axial direction together with the second retainer 70 and placed on the outer ring rolling surface 44, without interference between the second retainer 70 and the second outer ring 41 in a state where the rolling elements 35 are retained by the second retainer 70 and annularly and equally arranged.

Since this enables the first rolling bearing portion 30 and the second rolling bearing portion 40 to be easily formed without requiring the related-art complicated operation of equally arranging the plurality of rolling elements in the circumferential direction after the rolling elements are inserted between the inner ring and the outer ring while shifting the inner ring and the outer ring from each other, the reduction in overall cost of the bearing device 10 can be realized.

Additionally, since the plurality of rolling elements 35 are arranged between the inner ring rolling surface 39 or 49 and the outer ring rolling surface 34 or 44 by inserting the first outer ring 31 from the axial direction after the rolling elements 35 are placed on the inner ring rolling surface 39 of the first inner ring 36 or inserting the second inner ring 46 from the axial direction after the rolling elements 35 are placed on the outer ring rolling surface 44 of the second outer ring 41, the rolling elements 35 can be arranged without being limited in number and/or size thereof due to a gap between the inner ring and the outer ring unlike the related art. Accordingly, the rigidity of the bearing device 10 can be increased.

Additionally, since each of the plurality of claw portion pairs 63 are erected in the axial direction from the body portion 61, compared to a case where the plurality of claw portion pairs 63 are inclined with respect to the axial direction, the internal radius R1 of the first retainer 60 and the second retainer 70 can be made as large as possible, and the external radius R2 of the first retainer 60 and the second retainer 70 can be made as small as possible. Accordingly, the first retainer 60 and the second retainer 70 can be reliably kept from interfering with the first inner ring 36, the second inner ring 46, the first outer ring 31, and the second outer ring 41, and the bearing device 10 can be reduced in size even in the radial direction.

Additionally, since the axial lengths of the first outer ring 31 and the second outer ring 41 can be shortened, further reduction in size, weight, and cost of the bearing device 10 can be realized.

Additionally, since the axial lengths of the first inner ring 36 and the second inner ring 46 can be shortened, further reduction in size, weight, and cost of the bearing device 10 can be realized.

Additionally, the inner rings and the outer rings can be formed at low cost using forging, and the number of steps of cutting work can be reduced. Accordingly, the reduction in overall cost of the bearing device 10 can be realized.

Additionally, after the plurality of rolling elements 35 are retained by the first retainer 60 and the second retainer 70 and are annularly and equally arranged in advance in the retainer retaining step S13, the plurality of rolling elements 35 can be placed on the inner ring rolling surface 39 and the outer ring rolling surface 44 together with the first retainer 60 and the second retainer 70, in the first rolling element arranging step S17 and the second rolling element arranging step S21. Since this enables the plurality of rolling elements 35 to be equally arranged at a time, the complicated operation of equally arranging the plurality of rolling elements in the circumferential direction after the rolling elements are inserted between the inner ring and the outer ring while shifting the inner ring and the outer ring from each other is not required unlike the related art.

Additionally, since the first inner ring 36 of the first rolling bearing portion 30 includes the inner ring rolling surface 39 formed so as to have an external radius that becomes gradually larger than the first separation distance K1 from the inner side toward the outer side in the axial direction, the plurality of rolling elements 35 can be simply placed on the inner ring rolling surface 39 without using a jig or the like when being inserted into the first inner ring 36 from the other side (inner side in the axial direction) in the axial direction in the first rolling element arranging step S17.

Additionally, since the first retainer 60 and the second retainer 70 each are formed so that the internal radius R1 thereof becomes larger than the maximum external radius of the first inner ring 36 and the second inner ring 46, the rolling elements 35 can be arranged on the respective inner ring rolling surfaces 39 and 49 without interference between the first retainer 60 or the second retainer 70 and the first inner ring 36 or the second inner ring 46, in the first rolling element arranging step S17 and the second inner ring arranging step S23.

Additionally, since the second outer ring 41 of the second rolling bearing portion 40 includes the outer ring rolling surface 44 formed so that the internal radius thereof becomes gradually smaller than the second separation distance K2 from the outer side toward the inner side in the axial direction, the plurality of rolling elements 35 can be simply placed on the outer ring rolling surface 44 without using a jig or the like when being inserted into the second outer ring 41 from the other side (outer side in the axial direction) in the axial direction, in the second rolling element arranging step S21.

Additionally, since the first retainer 60 and the second retainer 70 each are formed so that the external radius R2 thereof becomes smaller than the minimum internal radius of the first outer ring 31 and the second outer ring 41, the rolling elements 35 can be arranged on the respective outer ring rolling surfaces 34 and 44 without interference between the first retainer 60 or the second retainer 70 and the first outer ring 31 or the second outer ring 41, in the outer ring assembly arranging step S19 (first outer ring arranging step S19A) and the second rolling element arranging step S21.

In this way, according to the method of manufacturing the bearing device 10 of the present embodiment, the bearing device 10 can be simply manufactured. Thus, the manufacturing cost can be reduced and the reduction in overall cost of the bearing device 10 can be realized.

Additionally, according to the present embodiment, since the bearing device 10 that can realize cost reduction is included, reduction in cost of the information recording/reproducing apparatus 1 can be realized.

Modification Example of First Embodiment

Figure 12:
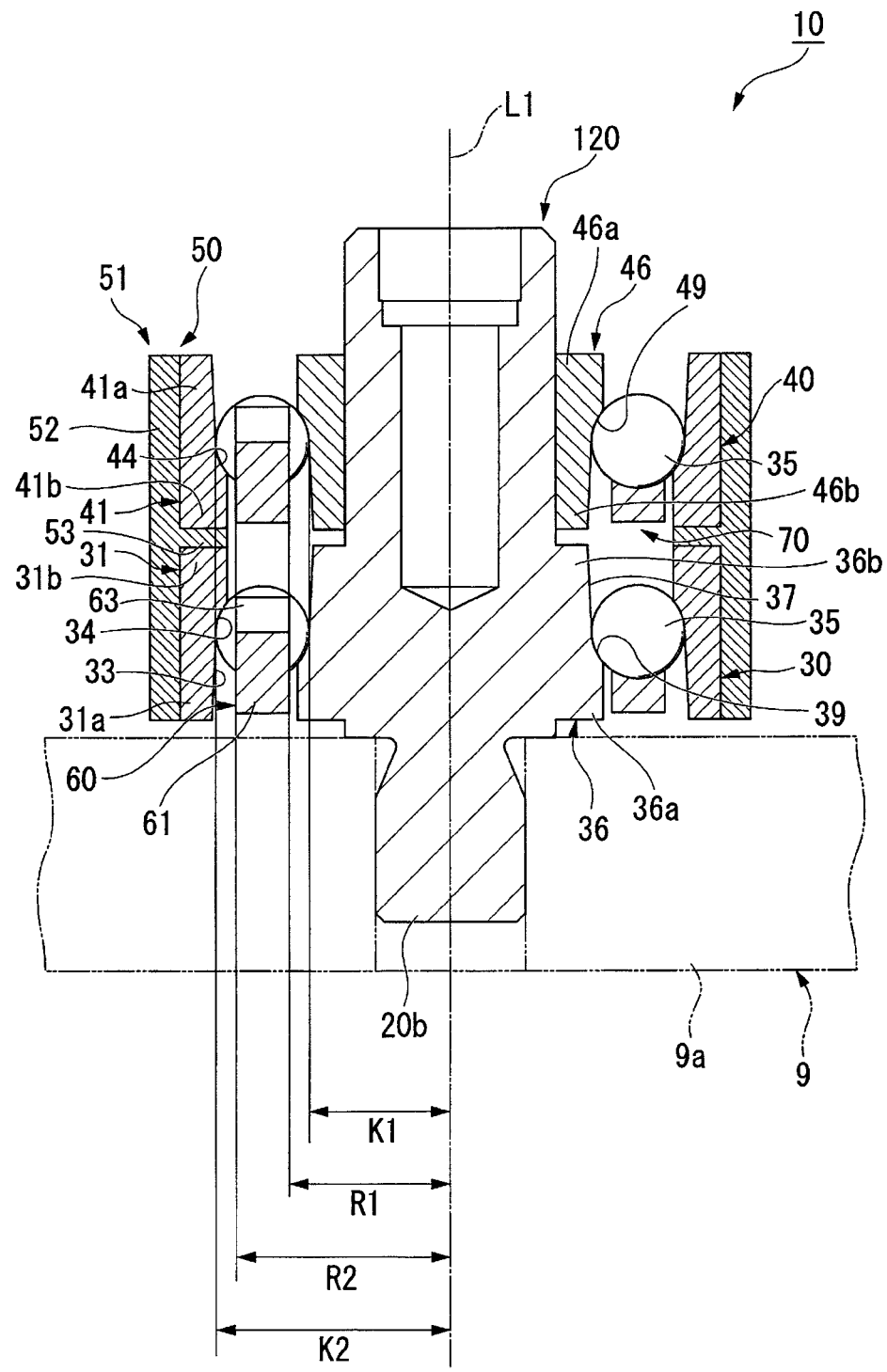
FIG. 12 is a side cross-sectional view of the bearing device related to a modification example of the first embodiment.

FIG. 12 is an explanatory view of the bearing device 10 related to a modification example of the first embodiment.

Subsequently, the bearing device 10 related to the modification example of the first embodiment will be described. In addition, the description of the same components as those of the first embodiment will be omitted, and only portions that are different will be described.

In the bearing device 10 of the first embodiment, the shaft 20, the first inner ring 36, and the second inner ring 46 are formed as separate parts (refer to FIG. 2).

In contrast, a shaft 120 and the first inner ring 36 may be integrally formed, as in the bearing device 10 related to the modification example of the first embodiment shown in FIG. 12.

In the first embodiment, in the first inner ring arranging step S11, the first inner ring 36 is inserted into the shaft 20, and the first inner ring 36 is fixed to one side of the shaft 20 in the axial direction while being positioned in the axial direction (refer to FIG. 5). In contrast, since the shaft 120 and the first inner ring 36 are integrally formed in the modification example of the first embodiment, it is not necessary to position the first inner ring 36 in the axial direction.

Effects of Modification Example of First Embodiment

According to the modification example of the first embodiment, since the number of parts of the bearing device 10 can be further reduced, and further reduction in size, weight, and cost of the bearing device 10 can be realized. Additionally, since it is not necessary to insert the first inner ring 36 of the first rolling bearing portion 30 into the shaft 120, the number of assembling steps of the bearing device 10 can be reduced, and manufacturing cost can be reduced. Accordingly, further reduction in overall cost of the bearing device 10 can be realized.

In addition, although a case where the shaft 120 and the first inner ring 36 of the first rolling bearing portion 30 are integrally formed has been described as an example in the modification example of the first embodiment, the shaft 120 and the second inner ring 46 of the second rolling bearing portion 40 may be integrally formed. That is, if either the first inner ring 36 of the first rolling bearing portion 30 or the second inner ring 46 of the second rolling bearing portion 40 is formed integrally with the shaft 120, the above functional effects can be obtained.

Second Embodiment

Figure 13:
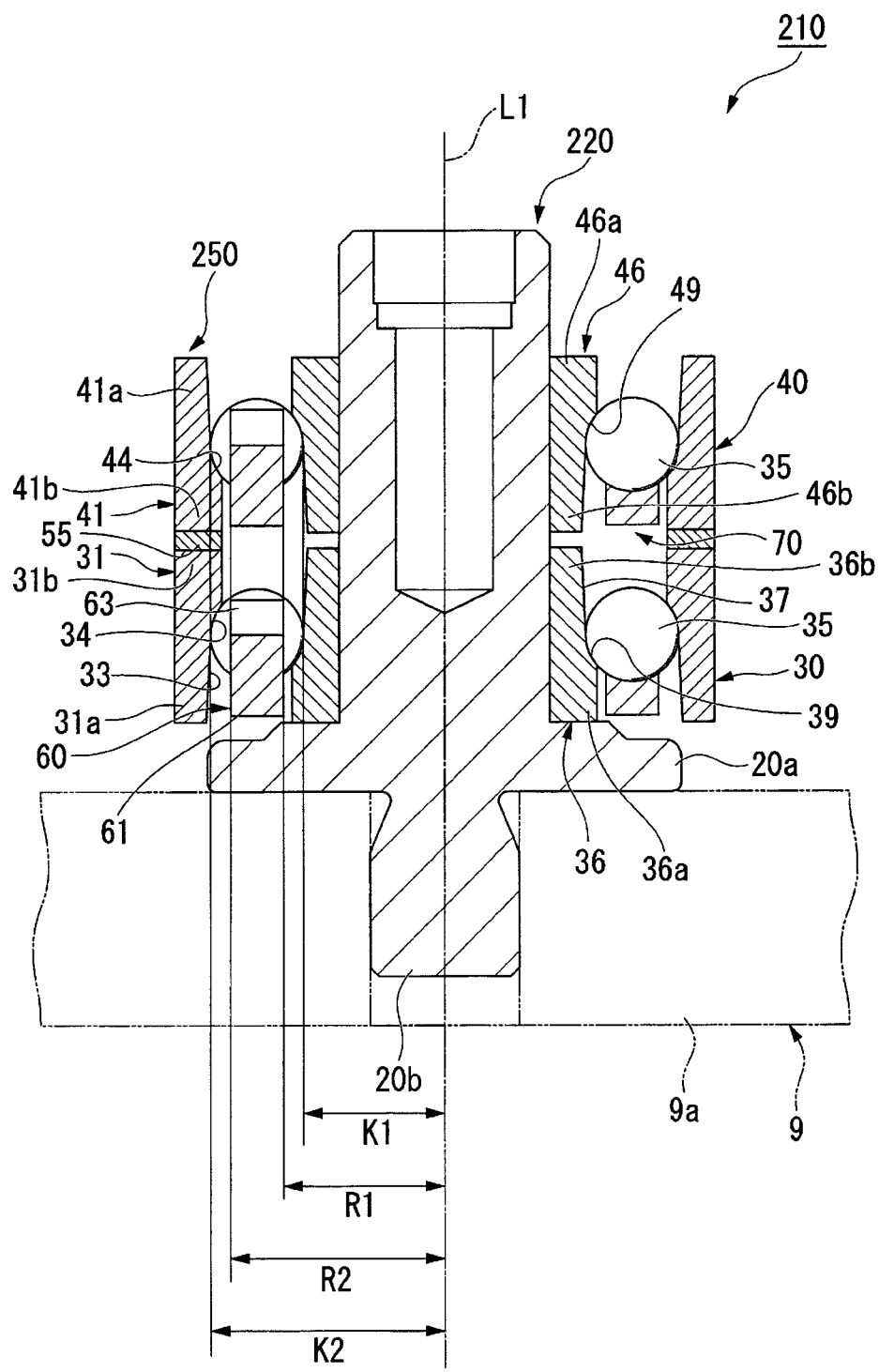
FIG. 13 is a side cross-sectional view of the bearing device related to a second embodiment.

FIG. 13 is an explanatory view of a bearing device 210 related to a second embodiment.

Subsequently, the bearing device 210 related to the second embodiment will be described. In addition, the description of the same components as those of the first embodiment will be omitted, and only portions that are different will be described.

In the bearing device 10 of the first embodiment, the first outer ring 31 and the second outer ring 41 are respectively fixed by the sleeve 51 so as to be immovable relative to each other, and the first outer ring 31 and the second outer ring 41 are arranged in a state where the first outer ring and the second outer ring are spaced apart from each other by a predetermined interval in the axial direction by interposing the spacer portion 53 of the sleeve 51 (refer to FIG. 2).

In contrast, by interposing an annular spacer 55 between the first inner ring 36 and the second inner ring 46 as in the bearing device 210 related to the second embodiment shown in FIG. 13, the first outer ring 31 and the second outer ring 41 may be arranged in a state where the first outer ring and the second outer ring are spaced apart from each other by a predetermined interval in the axial direction.

A flange portion 20a whose diameter is made larger than the diameter of the shaft 220 and a diameter-reduced portion 20b whose diameter is made smaller than the diameter of the shaft 220 are continuously provided in the base end portion of the shaft 220 in this order from the other side to one side in the axial direction. As the flange portion 20a comes into contact with the bottom portion 9a of the housing 9, the shaft 220 is positioned in the height direction.

Additionally, the first inner ring 36 is fixed to one side of the shaft 220 in the axial direction with, for example, an adhesive or the like in a state where the first inner ring is inserted into the shaft 220 and the outer end portion 36a abuts against the flange portion 20a of the shaft 220.

The first inner ring 36 and the first outer ring 31 are respectively formed so that the axial lengths (thickness) thereof are equal to each other. Additionally, the second inner ring 46 and the second outer ring 41 are respectively formed so that the axial lengths (thickness) thereof are equal to each other.

The spacer 55 is an annular member having a predetermined thickness in the axial direction, and is formed of, for example, metallic materials, such as aluminum, iron, or stainless steel. By interposing the spacer 55 between the first outer ring 31 and the second outer ring 41, similar to the first embodiment, a gap can be provided between the inner end portion 36b of the first inner ring 36 and the inner end portion 46b of the second inner ring 46. As this causes the first inner ring 36 and the second inner ring 46 to be relatively pressed, the separation distance between the first inner ring 36 and the second inner ring 46 can be shortened. Thus, a preload can be applied to the first rolling bearing portion 30 and the second rolling bearing portion 40.

Method of Manufacturing Bearing Device of Second Embodiment

A method of manufacturing the bearing device 210 of the second embodiment includes a first outer ring arranging step of arranging the first outer ring 31 on the outer side of the first inner ring 36 in the radial direction and making the outer ring rolling surface 34 of the first outer ring 31 abut against the rolling elements 35, a spacer arranging step of arranging the spacer 55 on the other side of the first outer ring 31 in the axial direction, and the second outer ring arranging step of arranging the second outer ring 41 on the other side of the spacer 55 in the axial direction, after the first rolling element arranging step.

In the spacer arranging step, the end face of the spacer 55 on one side is coated with, for example, an adhesive. Then, the end face of the spacer 55 on one side is fixed in a state where the end face is made to abut against the inner end portion 31b of the first outer ring 31.

Additionally, in the second outer ring arranging step, the end face of the spacer 55 on the other side is coated with, for example, an adhesive. Then, the end face of the spacer 55 on the other side is fixed in a state where the end face is made to abut against the inner end portion 41b of the second outer ring 41.

In addition, the first outer ring 31, the spacer 55, and the second outer ring 41 may be coaxially arranged in the axial direction in advance and fixed with an adhesive or the like, and the first outer ring 31, the spacer 55, and the second outer ring 41 may be integrally formed to constitute an outer ring assembly 250. In this case, similar to the first embodiment, the first outer ring 31, the spacer 55, and the second outer ring 41 can be easily arranged on the outer side of the first inner ring 36 in the radial direction through the outer ring assembly arranging step.

First Modification Example of Second Embodiment

Figure 14:
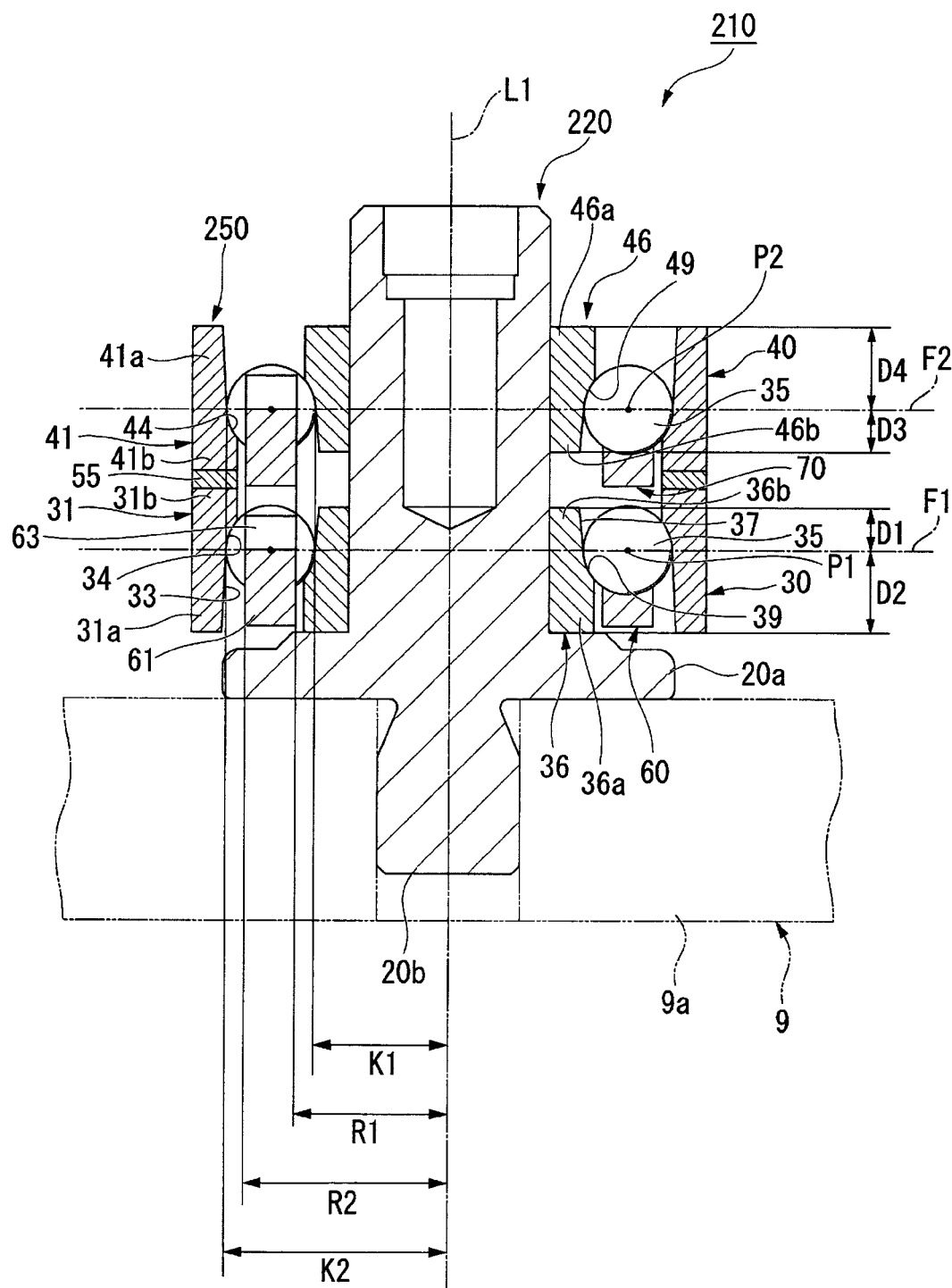
FIG. 14 is a side cross-sectional view of the bearing device related to a first modification example of the second embodiment.

FIG. 14 is an explanatory view of the bearing device 210 related to a first modification example of the second embodiment.

As in the bearing device 210 related to the first modification example of the second embodiment shown in FIG. 14, for example, the distance D1 from the imaginary plane F1 to the inner end portion 36b of the first inner ring 36 in the axial direction is arranged so as to be shorter than the distance D2 from the imaginary plane F1 to the outer end portion 36a of the first inner ring 36 in the axial direction, and a distance D3 from the imaginary plane F2 to the inner end portion 46b of the second inner ring 46 in the axial direction may be arranged so as to be shorter than a distance D4 from the imaginary plane F2 to the outer end portion 46a of the second inner ring 46 in the axial direction.

According to the first modification example of the second embodiment, the axial lengths of the first inner ring 36 and the second inner ring 46 can be shortened without reducing the rigidity of the bearing device 210. This enables further reduction in thickness, size, and cost of the bearing device 210 to be realized. Additionally, since the length of the inner end portion 36b of the first inner ring 36 in the axial direction and the length of the inner end portion 46b of the second inner ring 46 in the axial direction, which limit reduction in thickness of the bearing device 210, can be shortened, reduction in thickness of the bearing device 210 can be realized.

Second Modification Example of Second Embodiment

Figure 15:
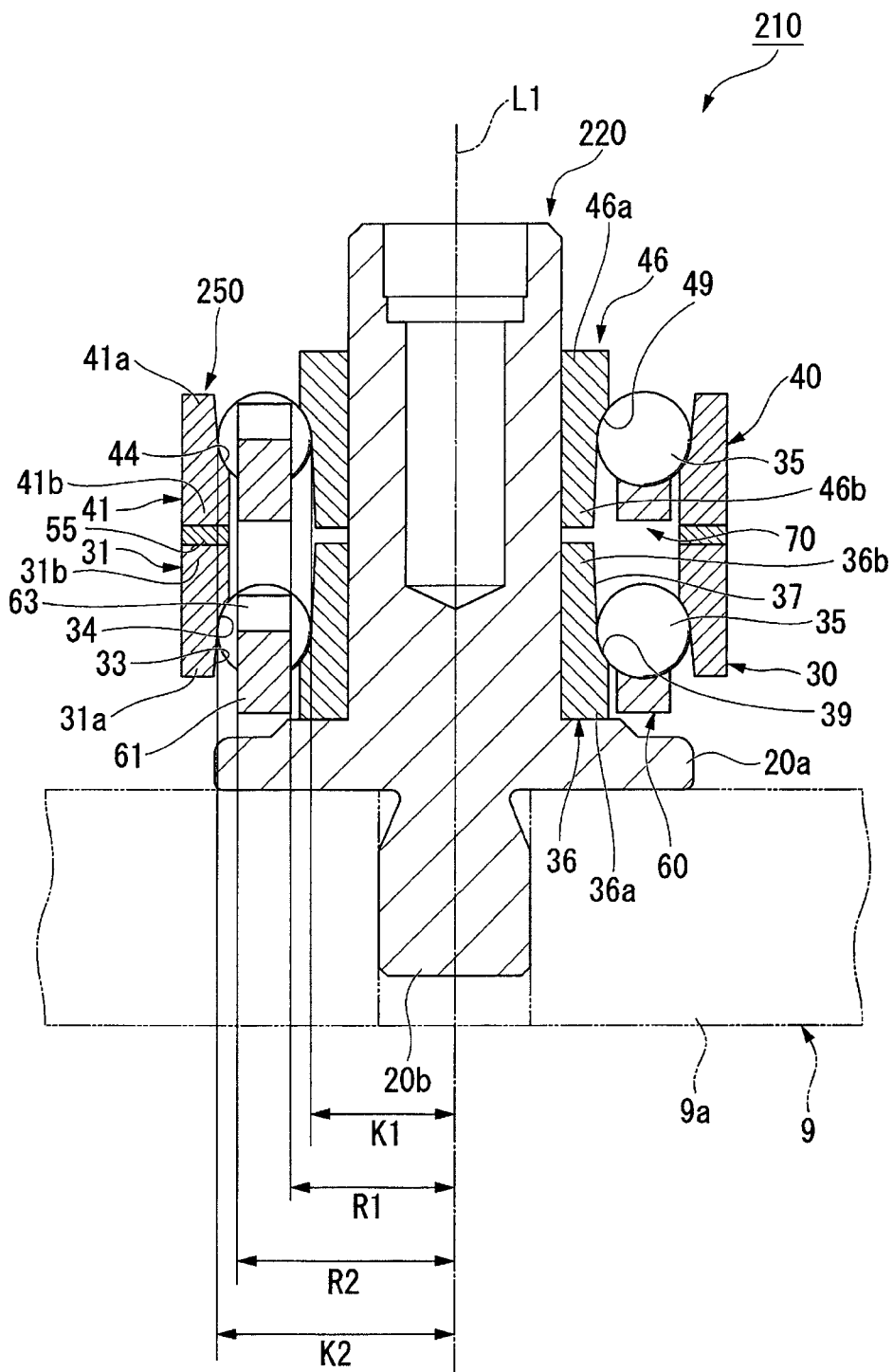
FIG. 15 is a side cross-sectional view of a bearing device related to a second modification example of the second embodiment.

FIG. 15 is an explanatory view of the bearing device 210 related to a second modification example of the second embodiment.

As in the bearing device 210 related to the second modification example of the second embodiment shown in FIG. 15, the outer end portion 31a of the first outer ring 31 and the outer end portion 41a of the second outer ring 41 may be arranged further toward the inner side than the outer end portion 36a of the first inner ring 36 and the outer end portion 46a of the second inner ring 46, respectively.

According to the second modification example of the second embodiment, the axial lengths of the first outer ring 31 and the second outer ring 41 can be shortened. This enables further reduction in size, weight, and cost of the bearing device 210 to be realized. Additionally, since the weights of the first outer ring 31 and the second outer ring 41 can be reduced, the resonant point of the bearing device 210 can be raised and it is also possible to cope with a high-speed operation.

Third Embodiment

Figure 16:
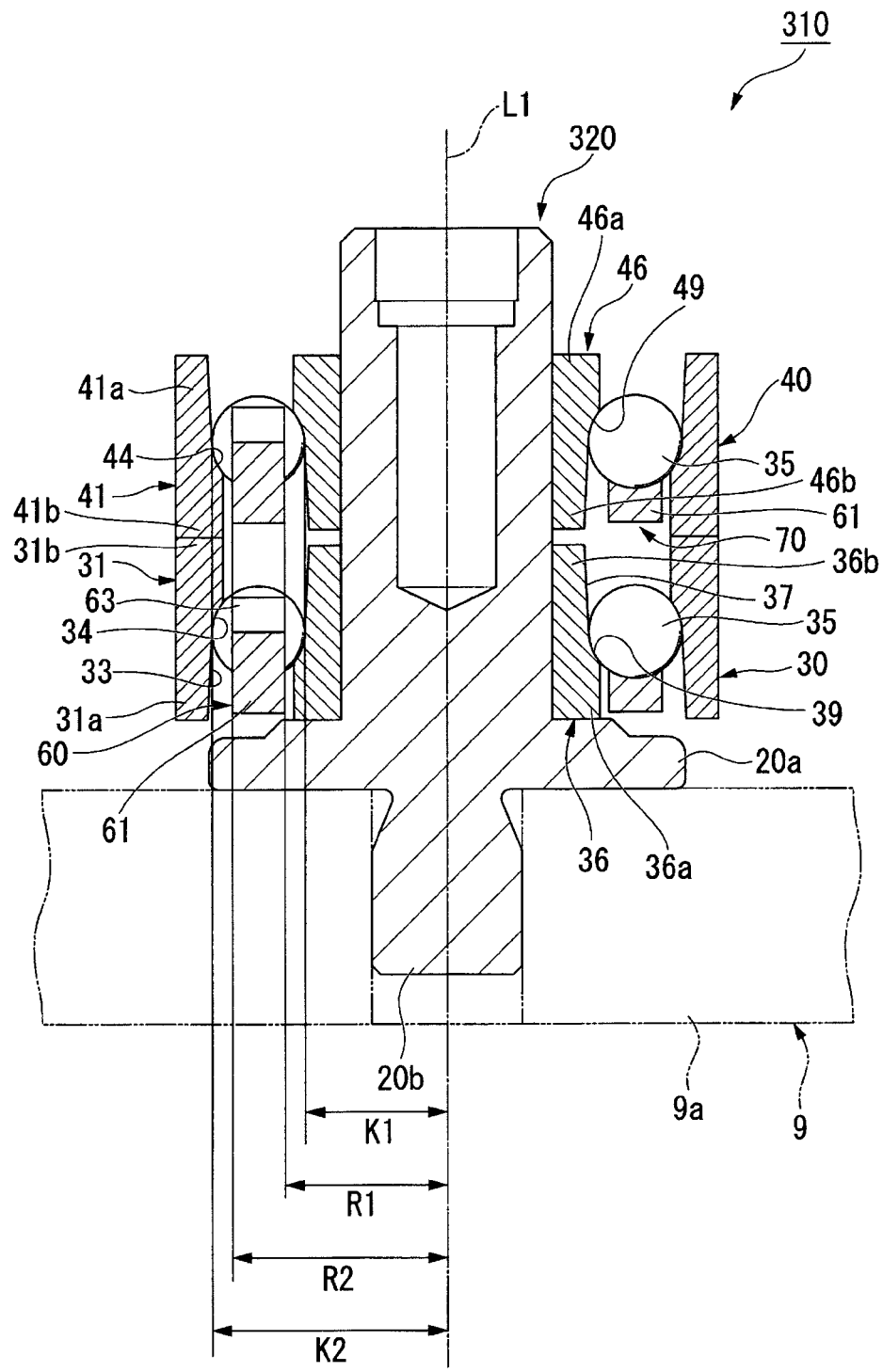
FIG. 16 is a side cross-sectional view of a bearing device related to a third embodiment.

FIG. 16 is an explanatory view of a bearing device 310 of a third embodiment.

Subsequently, the bearing device 310 of the third embodiment will be described. In addition, the description of the same components as those of the first embodiment will be omitted, and only portions that are different will be described.

In the bearing device 10 of the first embodiment, the first outer ring 31 and the second outer ring 41 are respectively fixed by the sleeve 51 so as to be immovable relative to each other, and the first outer ring 31 and the second outer ring 41 are arranged in a state where the first outer ring and the second outer ring are spaced apart from each other by a predetermined interval in the axial direction by interposing the spacer portion 53 of the sleeve 51 (refer to FIG. 2).

In contrast, as in the bearing device 310 related to the third embodiment shown in FIG. 16, the inner end portion 31b of the first outer ring 31 and the inner end portion 41b of the second outer ring 41 may be arranged to abut against each other by forming the inner end portion 31b of the first outer ring 31 and the inner end portion 41b of the second outer ring 41 so as to be longer further toward the inner side than the inner end portion 36b of the first inner ring 36 and the inner end portion 46b of the second inner ring 46, respectively.

According to the third embodiment, a gap can be provided between the inner end portion 36b of the first inner ring 36, and the inner end portion 46b of the second inner ring 46 without using a spacer. Accordingly, since a preload can be applied to the first rolling bearing portion 30 and the second rolling bearing portion 40 without using a spacer by relatively pressing the first inner ring 36 and the second inner ring 46, further reduction in size, weight, and cost of the bearing device 210 can be realized.

Modification Example of Third Embodiment

Figure 17:
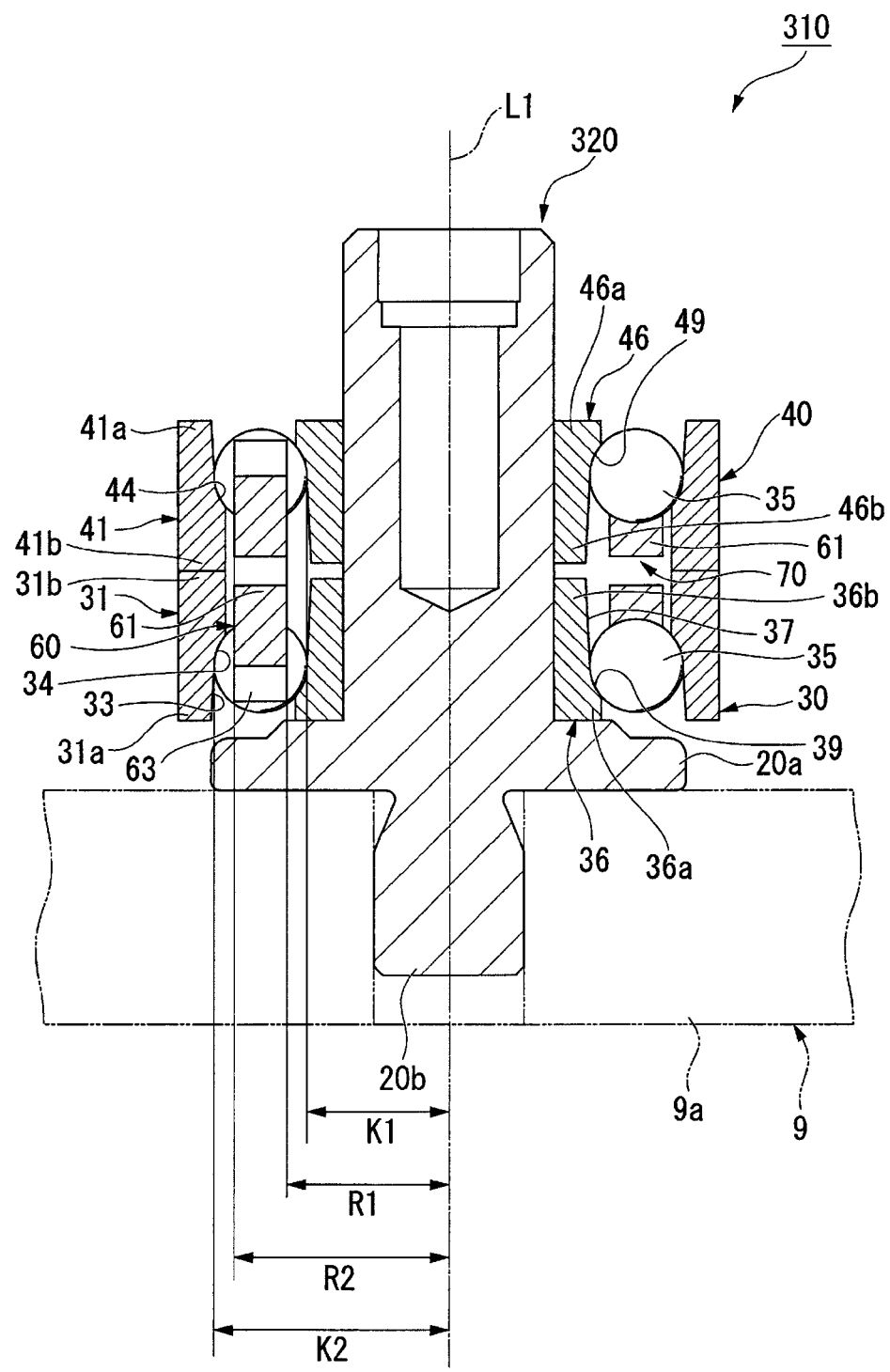
FIG. 17 is a side cross-sectional view of a bearing device related to a modification example of the third embodiment.

FIG. 17 is an explanatory view of the bearing device 310 related to a modification example of the third embodiment.

Subsequently, the bearing device 310 related to the modification example of the third embodiment will be described. In addition, the description of the same components as those of the third embodiment will be omitted, and only portions that are different will be described.

In the bearing device 310 of the third embodiment, the body portion 61 of the first retainer 60 is arranged on the outer side in the axial direction, and the body portion 61 of the second retainer 70 is arranged on the inner side in the axial direction (refer to FIG. 16).

In contrast, as in the bearing device 310 related to the modification example of the third embodiment shown in FIG. 17, the body portion 61 of the first retainer 60 and the body portion 61 of the second retainer 70 may be arranged on the inner side in the axial direction, respectively.

The body portion 61 of the first retainer 60 and the body portion 61 of the second retainer 70 have thicknesses in the axial direction in order to retain the rolling elements 35. Accordingly, reduction in thickness (shortening in the axial direction) of the bearing device 310 is limited by the body portion 61 of the first retainer 60 and the body portion 61 of the second retainer 70. Here, in the bearing device 310 of the third embodiment shown in FIG. 16, a region closer to the inner side in the axial direction than the claw portions of the first retainer 60 becomes as a dead space. Accordingly, by arranging the body portion 61 of the first retainer 60 on the inner side in the axial direction as shown in FIG. 17, reduction in thickness (shortening in the axial direction) of the bearing device 310 can be prevented from being limited by the body portion 61 of the first retainer 60. This enables the bearing device 310 to be reduced in thickness as much as possible.

Fourth Embodiment

Figure 18:
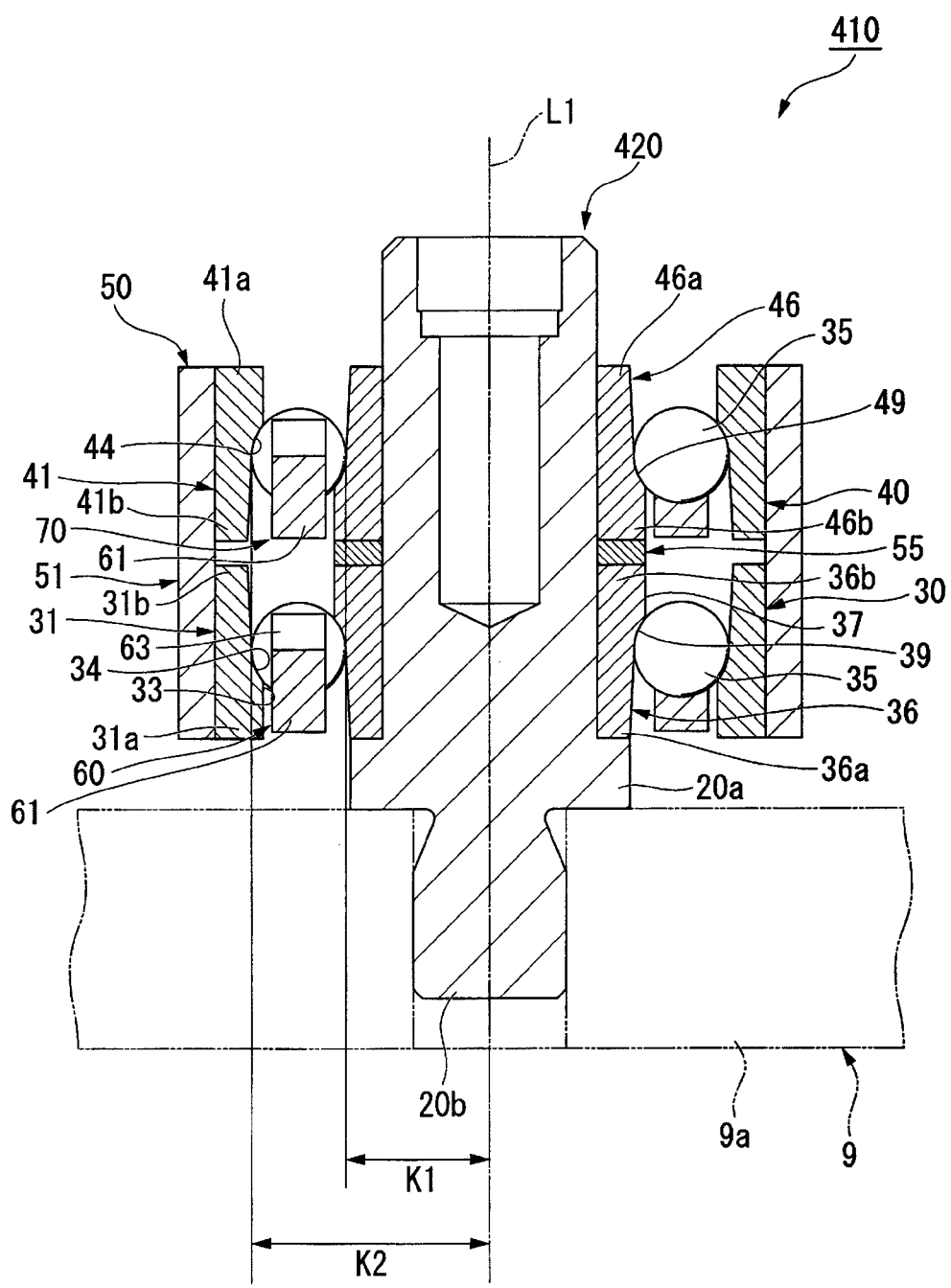
FIG. 18 is a side cross-sectional view of the bearing device related to a fourth embodiment.

FIG. 18 is an explanatory view of a bearing device 410 of a fourth embodiment.

Subsequently, the bearing device 410 of the fourth embodiment will be described. In addition, the description of the same components as those of the first embodiment will be omitted, and only portions that are different will be described.

The bearing device 10 of the first embodiment is a so-called inner ring preload bearing device 10 in which the first outer ring 31 and the second outer ring 41 are respectively fixed by the sleeve 51 so as to be immovable relative to each other, and the first inner ring 36 and the second inner ring 46 are fixed to the shaft 20 in a state where the first inner ring and the second inner ring are relatively pressed in the axial direction (refer to FIG. 2).

In contrast, as in the bearing device 410 related to the fourth embodiment shown in FIG. 18, a so-called outer ring preload bearing device 410 may be adopted in which the first inner ring 36 and the second inner ring 46 are fixed to a shaft 420, and the first outer ring 31 and the second outer ring 41 are fixed to the sleeve 51 in a state where the first outer ring and the second outer ring are relatively pressed in the axial direction.

In this way, the invention can be applied under any preload of the inner ring preload and the outer ring preload, and the same functional effects as the first embodiment can be exhibited.

In addition, the technical scope of the invention is not limited to the above embodiments, and various changes can be made without departing from the scope of the invention.

The shapes of the shafts 20, 220, 320, and 420 are not limited to the respective embodiments and the respective modification examples of the respective embodiments. Additionally, the shapes of the first retainer 60 and the second retainer 70 and the numbers of rolling elements 35 to be arranged are not limited to the respective embodiments. For example, in the first retainers 60 and the second retainers 70 of the respective embodiments and the respective modification examples of the respective embodiments, the claw portion 63 is erected in the axial direction from the body portion 61. In contrast, the claw portion 63 may be erected toward the outer side in the radial direction or the inner side in the radial direction so as to incline in the axial direction from the body portion 61.

In the first embodiment, the bearing device 10 is applied as a rotating shaft of the arm 8 of the information recording/reproducing apparatus 1. However, the application of the bearing device 10 is not limited to the rotating shaft of the arm 8 of the information recording/reproducing apparatus 1. For example, the bearing device 10 may be applied as a rotating shaft of the spindle motor 7 that rotates the disk D of the information recording/reproducing apparatus 1, or the bearing device 10 may be applied as a rotating shaft of a polygon mirror for scanning a laser light source.

Additionally, in the respective embodiments and the respective modification examples of the respective embodiments, the first retainer 60 and the second retainer 70 are included. However, the plurality of rolling elements 35 may be arranged between the inner ring rolling surface 39 or 49 and the outer ring rolling surface 34 or 44 without using the first retainer 60 and the second retainer 70. Additionally, at this time, in the process of manufacturing the bearing device 10, the retainer retaining step S13 becomes unnecessary, and the first rolling element arranging step S17 and the second rolling element arranging step S21 can be performed by retaining the rolling elements 35 with a jig or the like.

Additionally, in the first embodiment to the third embodiment, a fixed position preload that is the so-called inner ring preload is adopted in which a preload is applied by fixing the first inner ring 36 and the second inner ring 46 to the shaft 20, 120, 220, or 320 in a state where the first inner ring 36 and the second inner ring 46 are relatively pressed in the axial direction. Additionally, in the fourth embodiment, a fixed position preload that is the so-called outer ring preload is adopted in which a preload is applied by fixing the first outer ring 31 and the second outer ring 41 to the sleeve 51 in a state where the first outer ring 31 and the second outer ring 41 are relatively pressed in the axial direction. In contrast, for example, a so-called constant pressure preload may be adopted in which a preload is applied by providing a biasing member and by retaining the first inner ring 36 and the second inner ring 46 or the first outer ring 31 and the second outer ring 41 in a state where the first inner ring and the second inner ring or the first outer ring and the second outer ring are relatively pressed in the axial direction.

Additionally, in the fourth embodiment, the spacer 55 is interposed between the first inner ring 36 and the second inner ring 46. However, the spacer 55 may be eliminated to make the inner end portion 36b of the first inner ring 36 abut against the inner end portion 46b of the second inner ring 46 or integrally form the first inner ring 36 and the second inner ring 46.

Additionally, the inner ring rolling surfaces 39 and 49 and the outer ring rolling surfaces 34 and 44 in the respective embodiments and the respective modification examples of the respective embodiments are formed, respectively, in the shape of a curved surface whose external radius and internal radius vary gradually. In contrast, for example, the inner ring rolling surfaces 39 and 49 and the outer ring rolling surfaces 34 and 44 may partially include a planar portion.

Additionally, the respective embodiments and the respective modification examples of the respective embodiments may be appropriately combined, respectively. For example, a sleeve may be externally fitted to the first outer ring 31 and the second outer ring 41 of the third embodiment by combining the first embodiment and the third embodiment.

In addition, the constituent elements in the above-described embodiments can be substituted with well-known constituent elements without departing from the scope of the invention.

What is claimed is:

1. A bearing device comprising:

a shaft; and a pair of rolling bearing portions that are arranged side by side in an axial direction of the shaft, wherein the pair of rolling bearing portions each include an inner ring that is arranged coaxially with a central axis of the shaft; an outer ring that surrounds the inner ring from an outer side of the shaft in a radial direction; and a plurality of rolling elements that are rollably retained between the inner ring and the outer ring, and wherein when a separation distance between an innermost portion of the rolling elements in the radial direction and the central axis is defined as a first separation distance and a separation distance between an outermost portion of the rolling elements in the radial direction and the central axis is defined as a second separation distance, the inner ring includes an inner ring rolling surface formed so that the external radius of an end portion on any one side of an inner side and an outer side in the axial direction is smaller than the first separation distance and formed so as to have an external radius that becomes larger than the first separation distance from the one side in the axial direction toward any other side of the inner side and the outer side in the axial direction, and the outer ring includes an outer ring rolling surface formed so that the internal radius of an end portion on the other side in the axial direction is larger than the second separation distance and formed so as to have an internal radius that becomes smaller than the second separation distance from the other side toward the one side in the axial direction.

2. The bearing device according to claim 1, wherein the inner rings of the pair of rolling bearing portions each include an inner ring rolling surface formed so that the external radius of an inner end portion in the axial direction is smaller than the first separation distance and formed so as to have an external radius that becomes larger than the first separation distance from the inner side toward the outer side in the axial direction, and wherein the outer rings of the pair of rolling bearing portions each include an outer ring rolling surface formed so that the internal radius of an outer end portion in the axial direction is larger than the second separation distance and formed so as to have an internal radius that becomes smaller than the second separation distance from the outer side toward the inner side in the axial direction.

3. The bearing device according to claim 2, wherein each rolling bearing portion has a retainer that rollably retains the plurality of rolling elements at regular circumferentially spaced intervals around the central axis, and wherein the retainers of the pair of rolling bearing portions each are formed to have an internal radius that is larger than a maximum external radius of the inner ring and to have an external radius that is smaller than a minimum internal radius of the outer ring.

4. The bearing device according to claim 3, wherein each retainer includes a body portion, and a plurality of claw portion pairs that are formed integrally with the body portion and that rollably retain the rolling elements, and wherein each of the plurality of claw portion pairs extend in the axial direction from the body portion.

5. The bearing device according to claim 4, wherein the body portion of each retainer is arranged further toward the inner side in the axial direction than the rolling elements.

6. The bearing device according to claim 2, wherein, in each rolling bearing portion, the outer end portion of the outer ring in the axial direction is arranged further toward the inner side in the axial direction than an outer end portion of the inner ring in the axial direction.

7. The bearing device according to claim 2, wherein, in each rolling bearing portion, a distance from an imaginary plane including the center of the plurality of rolling elements to the inner end portion of the inner ring in the axial direction is shorter than a distance from the imaginary plane to an outer end portion of the inner ring in the axial direction.

8. The bearing device according to claim 2, wherein any one inner ring of the inner rings of the pair of rolling bearing portions, and the shaft are formed integrally with each other.

9. The bearing device according to claim 2, wherein the inner ring and the outer ring of each rolling bearing portion are formed by forging.

10. A method of manufacturing the bearing device according to claim 1, comprising:
   a first arranging step of arranging any one member of the inner ring and the outer ring of a first rolling bearing portion out of the pair of rolling bearing portions;
   a first rolling element arranging step of inserting and arranging the plurality of rolling elements with respect the one member of the first rolling bearing portion from the axial direction;
   a second arranging step of inserting and arranging any other member of the inner ring and the outer ring of the first rolling bearing portion with respect to the plurality of rolling elements from the axial direction;
   a third arranging step of continuously arranging any other member of the inner ring and the outer ring of a second rolling bearing portion out of the pair of rolling bearing portions in the axial direction with respect to the other member of the first rolling bearing portion;
   a second rolling element arranging step of inserting and arranging the plurality of rolling elements with respect to the other member of the second rolling bearing portion from the axial direction;
   a fourth arranging step of inserting and arranging any one member of the inner ring and the outer ring of the second rolling bearing portion with respect to the plurality of rolling elements from the axial direction; and
   a preload applying step of relatively pressing and fixing any of the inner rings and the outer rings of the pair of rolling bearing portions in the axial direction.

11. A method of manufacturing the bearing device according to claim 3, comprising:
   a first inner ring arranging step of inserting a first inner ring out of the inner rings of the pair of rolling bearing portions into the shaft and arranging the first inner ring on one side in the axial direction;
   a retainer retaining step of making each of a first retainer and a second retainer out of the retainers of the pair of rolling bearing portions rollably retain and equally and annularly arrange the plurality of rolling elements;
   a first rolling element arranging step of inserting the plurality of rolling elements into the first inner ring together with the first retainer from the other side in the axial direction and placing the plurality of rolling elements on the inner ring rolling surface of the first inner ring;
   a first outer ring arranging step of arranging a first outer ring out of the outer rings of the pair of rolling bearing portions on the outer side of the first inner ring in the radial direction and making the outer ring rolling surface of the first outer ring abut against the plurality of rolling elements;
   a second outer ring arranging step of arranging a second outer ring out of the outer rings of the pair of rolling bearing portions on the other side in the axial direction;
   a second rolling element arranging step of inserting the plurality of rolling elements into the second outer ring together with the second retainer from the other side in the axial direction and placing the plurality of rolling elements on the outer ring rolling surface on the other side in the axial direction;
   a second inner ring arranging step of inserting a second inner ring out of the inner rings of the pair of rolling bearing portions into the shaft and arranging the second inner ring on the other side in the axial direction; and
   a preload applying step of fixing the first inner ring and the second inner ring to the shaft while relatively pressing the first inner ring and the second inner ring in the axial direction.

12. An information recording/reproducing apparatus comprising:
   the bearing device according to claim 1;
   a housing that supports one end portion of the bearing device;
   a rotating member that is externally fitted to the outer rings and rotates around the central axis of the shaft; and
   a slider that is mounted on the rotating member and performs recording and reproducing of information with respect to a magnetic recording medium.

13. The bearing device according to claim 1, wherein the outer rings of the pair of rolling bearing portions are separated and spaced from one another in the axial direction.

14. The bearing device according to claim 13, further comprising a spacer portion interposed between the outer rings to maintain the outer rings spaced apart from one another a predetermined interval in the axial direction.

15. The bearing device according to claim 14, further comprising a sleeve having a cylindrical body portion that surrounds and is fixed to outer sides of the outer rings, the spacer portion being integral with the cylindrical body portion and extending radially inwardly therefrom between the outer rings.

16. The bearing device according to claim 14, wherein the outer rings comprise separate and distinct rings having opposed end faces that face one another in the axial direction, the spacer portion being interposed between the opposed end faces.

17. The bearing device according to claim 13, wherein the outer rings comprise separate and distinct rings having opposed end faces that face one another in the axial direction.

18. The bearing device according to claim 1, wherein the outer rings comprise separate and distinct rings having opposed end faces that face one another in the axial direction.

* * * * *